United States Patent
Jarvis et al.

(10) Patent No.: US 11,645,593 B2
(45) Date of Patent: May 9, 2023

(54) USE OF IDENTITY AND ACCESS MANAGEMENT FOR SERVICE PROVISIONING

(71) Applicant: SENSORMATIC ELECTRONICS, LLC, Boca Raton, FL (US)

(72) Inventors: Graeme Jarvis, Marblehead, MA (US); Terezinha Rumble, Jensen Beach, FL (US); George C. Grammer, West Palm Beach, FL (US); Michael Lamarca, Parker, CO (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 8 days.

(21) Appl. No.: 15/911,537

(22) Filed: Mar. 5, 2018

(65) Prior Publication Data
US 2019/0095835 A1    Mar. 28, 2019

Related U.S. Application Data

(60) Provisional application No. 62/561,743, filed on Sep. 22, 2017.

(51) Int. Cl.
*G06Q 10/06*      (2012.01)
*G06Q 10/0631*    (2023.01)
*G06Q 20/40*      (2012.01)

(52) U.S. Cl.
CPC ....... *G06Q 10/06313* (2013.01); *G06Q 10/06* (2013.01); *G06Q 20/4014* (2013.01)

(58) Field of Classification Search
CPC ......... G06Q 10/06313; G06Q 20/4014; G06Q 10/06; G06Q 20/40; G06Q 30/0255; G06Q 20/405

(Continued)

(56) References Cited

U.S. PATENT DOCUMENTS 5,743,349 A    4/1998  Steinberg
6,259,405 B1   7/2001  Stewart et al.
(Continued)

FOREIGN PATENT DOCUMENTS

WO    WO-2018/048640    3/2018
WO    WO-2018/048651    3/2018
(Continued)

OTHER PUBLICATIONS

M. Morshedi, J. Noll and R. Kari, "Building Trustable Remote Monitoring and Management Systems," 2018 IEEE/ACM International Conference on Utility and Cloud Computing Companion (UCC Companion), 2018, pp. 213-219, doi: 10.1109/UCC-Companion .2018.00059. (Year: 2018).*

(Continued)

*Primary Examiner* — Mehmet Yesildag
*Assistant Examiner* — Jeremy L Gunn
(74) *Attorney, Agent, or Firm* — Foley & Lardner LLP

(57) ABSTRACT

Described is a system for monitoring provisions of services. The system includes a work order system for producing one or more work orders, an identity and access management system to verify information regarding a service provider and a system that receives a produced work order associated with a service provider upon receipt of a service request. The system requests information regarding service provider attributes from the identity and access management system, and receives from the identity and access management system information regarding at least some of the attributes of the service provider. The system determines a requisite level of expertise required for the service and determines whether the attributes received from the identity and access management system indicate that the service provider has the requisite level of attributes.

20 Claims, 20 Drawing Sheets

(58) Field of Classification Search
USPC ....... 705/14.54, 14.53, 14.66, 14.73; 725/36, 725/35; 726/5, 27; 707/999.003, 780, 707/E17.044; 709/219, 217, 225, 204; 379/114.14, 144.03, 127.02
See application file for complete search history.

(56) References Cited

U.S. PATENT DOCUMENTS

| | | | |
|---|---|---|---|
| 6,748,792 | B1 | 6/2004 | Freund et al. |
| 7,043,443 | B1* | 5/2006 | Firestone ............... G06Q 30/08 705/7.14 |
| 8,344,850 | B2 | 1/2013 | Girard et al. |
| 9,589,405 | B2 | 3/2017 | Cabouli et al. |
| 9,858,781 | B1 | 1/2018 | Campero et al. |
| 10,055,926 | B2 | 8/2018 | Campero et al. |
| 10,453,319 | B2 | 10/2019 | Jarvis et al. |
| 10,475,272 | B2 | 11/2019 | Campero et al. |
| 10,475,273 | B2 | 11/2019 | Campero et al. |
| 2006/0184456 | A1 | 8/2006 | De Janasz |
| 2008/0243561 | A1 | 10/2008 | Deygout et al. |
| 2008/0277183 | A1 | 11/2008 | Huang et al. |
| 2009/0210308 | A1 | 8/2009 | Toomer et al. |
| 2010/0280752 | A1 | 11/2010 | Huang et al. |
| 2011/0060480 | A1 | 3/2011 | Mottla et al. |
| 2011/0202393 | A1 | 8/2011 | Dewakar et al. |
| 2012/0095797 | A1* | 4/2012 | Nishimura ....... G06Q 10/06311 705/7.13 |
| 2013/0317693 | A1 | 11/2013 | Jeffries et al. |
| 2014/0090036 | A1 | 3/2014 | Roberts |
| 2014/0091903 | A1 | 4/2014 | Birkel et al. |
| 2014/0351328 | A1 | 11/2014 | Woods et al. |
| 2015/0095190 | A1 | 4/2015 | Hammad et al. |
| 2015/0278508 | A1* | 10/2015 | Johnson ............... G06F 16/434 726/29 |
| 2015/0286670 | A1* | 10/2015 | Hall ..................... G06Q 10/06 715/234 |
| 2016/0036788 | A1 | 2/2016 | Conrad et al. |
| 2016/0132816 | A1* | 5/2016 | Lush ............. G06Q 10/063112 705/7.14 |
| 2016/0134599 | A1 | 5/2016 | Ross et al. |
| 2016/0180618 | A1 | 6/2016 | Ho et al. |
| 2016/0189528 | A1 | 6/2016 | Lee et al. |
| 2016/0217280 | A1 | 7/2016 | Oberheide et al. |
| 2016/0275638 | A1 | 9/2016 | Korpi et al. |
| 2016/0321565 | A1 | 11/2016 | Mendoza et al. |
| 2017/0111175 | A1* | 4/2017 | Oberhauser ...... G11B 20/00086 |
| 2017/0177855 | A1 | 6/2017 | Costa Faidella et al. |
| 2017/0214675 | A1 | 7/2017 | Johnsrud et al. |
| 2017/0300898 | A1 | 10/2017 | Campero et al. |
| 2018/0041860 | A1 | 2/2018 | England |
| 2018/0072416 | A1 | 3/2018 | Cantrell et al. |
| 2018/0075247 | A1 | 3/2018 | Campero et al. |
| 2018/0075677 | A1 | 3/2018 | Campero et al. |
| 2018/0077151 | A1 | 3/2018 | Campero et al. |
| 2018/0194323 | A1 | 7/2018 | Woodill et al. |
| 2019/0025809 | A1* | 1/2019 | Bhattacharya ......... G06N 5/046 |
| 2019/0087781 | A1* | 3/2019 | Mercury ............ G06K 9/00302 |
| 2019/0188941 | A1 | 6/2019 | Campero et al. |

FOREIGN PATENT DOCUMENTS

| | | | | |
|---|---|---|---|---|
| WO | WO-2018/048662 | | 3/2018 | |
| WO | WO-2018/048663 | | 3/2018 | |
| WO | WO-2018/048691 | | 3/2018 | |
| WO | WO-2018/048692 | | 3/2018 | |
| WO | WO-2019094611 A | * | 5/2019 | ......... H04L 63/0428 |

OTHER PUBLICATIONS

Office Action for U.S. Appl. No. 15/911,512, dated Oct. 3, 2018, 9 pages.
Office Action for U.S. Appl. No. 15/911,613, dated Nov. 13, 2018, 39 pages.
European Search Report, EP Application No. 18195939.6, dated Feb. 27, 2019, 9 pages.
European Search Report, EP Application No. 18196020.4, dated Feb. 27. 2019, 8 pages.
European Search Report, EP Application No. 18196220, dated Jan. 17, 2019, 8 pages.
European Search Report, EP Application No. 18195994.1, dated Feb. 27, 2019, 7 pages.
Swan, Melanie, E-Commerce, Jan. 22, 2015, XP055406241, http://w2.blockchain-tec.net/blockchain/blockchain-by?melanie-swan.pdf, 149 pages.
Franco, Pedro, "Understanding Bitcoin: Cryptography, Engineering and Economics," John Wiley & Sons, UK, Oct. 24, 2014, 272 pages.
Office Action on EP 18195994.1, dated Mar. 11, 2021, 10 pages.
Office Action on EP 18196220.0, dated Mar. 9, 2021, 14 pages.
Zhu, et al., "Autonomic Identity Framework for the Internet of Things," 2017 International Conference on Cloud and Autonomic Computing (ICCAC), pp. 69-79 (2017).
Office Action on EP 18195939.6, dated Jul. 1, 2021, 11 pages.
Office Action on EP 18196020.4, dated Jul. 15, 2021, 9 pages.
Summons to Attend Oral Proceedings on EP Appl. No. 18196220, dated Oct. 14, 2022 (15 pages).
European Office Action on EP Appl. No. 18195939.6 dated Sep. 22, 2022 (13 pages).

* cited by examiner

USE OF IDENTITY AND ACCESS MANAGEMENT FOR SERVICE PROVISIONING

CLAIM OF PRIORITY

This application claims priority under 35 U.S.C. § 119(e) to provisional U.S. Patent Application 62/561,743, filed on Sep. 22, 2017, entitled: "Methods and Apparatus for implementing Identity and Access Management," the entire contents of which are hereby incorporated by reference.

BACKGROUND

This description relates to operation of networks for dissemination of information.

It is common for computer systems to gather information, such as proprietary data on individuals other entities such as businesses etc., as well on operational data from other systems. One type of information is proprietary data such as "personally identifiable information" commonly referred to as "PII." PII is information of a sensitive, personal nature that is generally associated with individuals and is often protected by privacy laws in many jurisdictions. PII is information that can identify or contact or locate a single person or to identify an individual in context. Examples of PII include name, social security number, date and place of birth, mother's maiden name, biometric records and information that is linkable to an individual, such as medical, educational, financial, and employment information, as well as a user's device IP address used in a communication service broker.

Another type of information is proprietary data such as Machine Identifiable Information or "MII," such as in the context of the "Internet of Things." That is, other information that is collected includes operational information such as information used to control access control systems, intrusion detection systems and integrated security/alarm systems. For different reasons each of these types of information may have a sensitive nature that should limit the ubiquitous retention of such information in disparate systems.

Considering PII, modern information technology and the Internet have made it easier to collect PII and MII through various mechanisms leading to various problems such as aiding of criminal acts, identity theft, etc. For example, there have been numerous reports of security breaches of commercial, governmental and private systems having databases storing the PII information of many thousands or millions of individuals.

Service is routinely performed in various commercial premises on specific types of building automation equipment, such as HVAC, Access Control, Fire Detection, etc. These services are often performed on a routine basis and also when such building automation equipment experience problems or failures in operation.

SUMMARY

Considering that such services are routinely performed in various commercial premises on specific types of building automation equipment either on a routine basis and/or when there are failures of such building automation equipment, a building owner would have an interest in the talent and attendance of technicians that service the equipment. While, the building owner (or its agent) would typically schedule the service, neither the building owner nor agent would necessarily have knowledge of the level of expertise of the service provider required for the service and of the specific service provider that is assigned to service the equipment. Moreover, absent functioning access control systems, the building owner would not necessarily have knowledge of the time of arrival of the service provider or how long the service provider was onsite. As used herein a service provider can be a technician or can be an organization that employs several technicians and these terms are used interchangeably below.

According to an aspect, a method for monitoring provisioning of services includes receiving by a system a produced work order upon receipt of a service request, which work order is associated with a service provider, requesting from an identity and access management system, information regarding the service provider attributes, receiving by the identity and access management system information regarding at least some of the attributes of the service provider, determining a requisite level of expertise required for the service from the work order, and determining whether the attributes received from the identity and access management system indicate that the service provider has the requisite level of attributes.

Aspects also include computer program products and methods. Additional features of the computer program product, systems and methods include other features disclosed herein.

One or more of the above aspects may provide one or more of the following advantages.

In some implementations, these aspects enable user devices to transmit PII (and other confidential information) without that information being hosted by third party (requesting systems) that would otherwise manage and store such PII (and other confidential information). In other implementations information can be hosted by third party systems or such information can be held by third party systems for attestation purposes, e.g., a registry such as a motor vehicle registry. Currently third party requester systems are ubiquitous, but the techniques currently employed make such information vulnerable to improper access and disclosure through various types of hacking attacks on any of the ubiquitous numbers of third party requester systems.

The disclosed techniques including an identity application that in conjunction with the distributed ledgers can send to user devices containing a wallet a verified access or access error depending on the outcome of processing. All exchanges are logged in the distributed ledger for audit tracking, etc. and verification of information can be used with information in the distributed ledger. Records are added to the distributed ledger as transactions and include a hashed record of the transaction, what was exchanged, the signatures of the parties, and may include additional detailed information depending on the type of distributed ledger used.

The details of one or more embodiments of the invention are set forth in the accompanying drawings and the description below. Other features, objects, and advantages of the invention is apparent from the description and drawings, and from the claims.

DETAILED DESCRIPTION

Described herein is use of an IAM system (Identity and Access Management) for talent and attendance verification. The IAM system includes a set of techniques that provide a solution using a private service broker for dissemination of information such as PII (as well as other confidential information) between two or more electronic devices. The dissemination of information occurs in a controlled, secure and confidential manner. Also described is a mechanism that allows for the verification of information including PII (as well as other confidential information), and credentials, without the actual disclosure of the PII (as well as other confidential information).

The talent and attendance verification system described uses a combination of an identity wallet that executes on a user device, a distributed ledger that manages proxies for PII (as well as other confidential information), along with a service broker system that securely manages data transmissions and verifications of the data without actually having the wallet directly access the distributed ledger. In some implementations the service broker is not needed.

Figure 1:
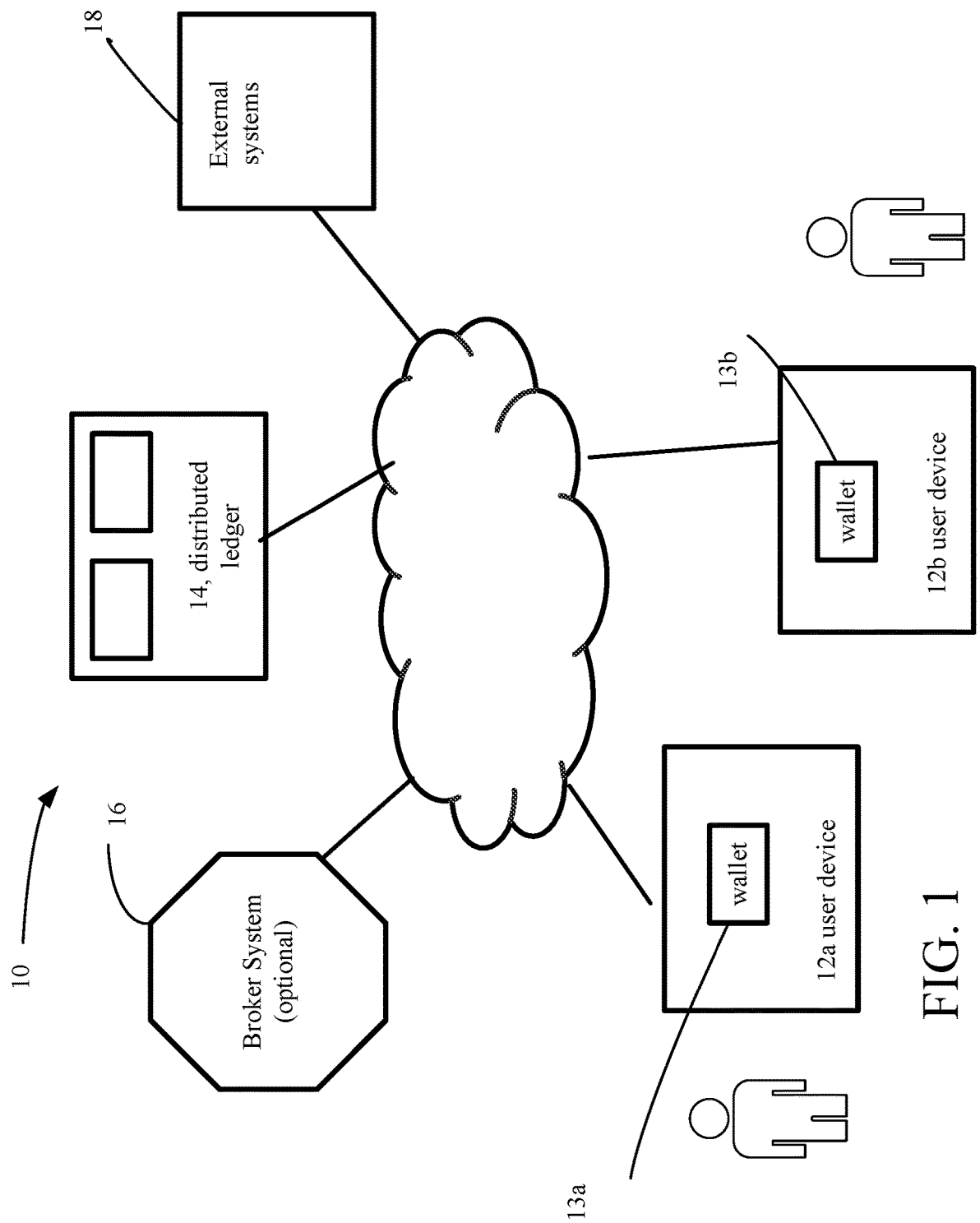
FIG. 1 is a schematic diagram of an exemplary system for securing PII information.

Referring now to FIG. 1, an exemplary distributed network IAM system 10 (system 10) for access control and talent credentials verification is shown. Approaches as discussed in detail in below use an Identity Wallet 13a, 13b with a distributed ledger 14 back-end that replaces the typical centralized database (not shown). The ID Wallet/distributed ledger approach provides enhanced user experience, security, compliance and so forth, as discussed below. The ID Wallet can replace and/or complement a conventional physical security badge.

The system 10 includes user devices, here wireless enabled user mobile devices, such as smartphones 12a, 12b that house respective identity wallets 13a, 13b. The smartphones 12a, 12b house the identity wallets (also referred to herein simply as wallets) 13a, 13b, respectively and thus carry user credentials and by use of the wallet and a processor on the smartphone, interacts with portions of the access control system 10.

The term "smartphone" is used to describe a mobile phone device that executes an advanced mobile operating system. The smartphone has hardware and a mobile operating system with features of personal computer hardware and operating systems along with features required for mobile or handheld operation, such as those functions needed for use of the smartphone as a cell phone and includes GPS (global position system) navigation. The smartphone executes applications (apps) such as a media player, as well as browsers, and other apps. Smartphones typically can access the Internet and have a touchscreen user interface. Other types of user devices could be used including personal computers, tablet computers, as well as, systems that are involved with exchange of sensitive data, such as access control systems and intrusion detection systems.

Other form factors can be used to house the identity wallet 13a such as wearables. Other aspects of identity can include biometrics. The smartcard may also have various physical forms. For illustrative purposes, the discussion will focus on the user devices 12a, 12b as being smartphones. The identity wallets 13a, 13b are housed in the smartphones. As used herein an identity wallet includes an application that executes on an electronic device, such as the user devices 12a, 12b, and which allows a user of the device to store identity information, encrypt such identity information and communicate with external systems via communication functions/circuity on the smartphone.

Identity Wallets 13a, 13b are also used to authenticate credentials of the holder of the particular wallet, as well as other wallets and other systems/devices, as will be discussed below. The term "wallet" encompasses an arrangement of three major systems, an electronic infrastructure, an application that operates with the system and the device (e.g., smartphone) that holds the wallet. In the discussion below, the holder's proprietary data is associated with the wallet. For example, many pieces of identifying information can be stored in the wallet.

Such information can be diverse and wide-ranging, such as, bank account information, as well as the holder's information such as driver's license, health records, health care, loyalty card(s) and other ID documents stored on the phone, social security no., etc. All of this information can be stored in some manner and/or linked to the wallet. In particular stored in this wallet are pieces of information identifying the holders credentials, i.e., expertise in servicing systems/software, etc. Systems are broadly defined as mechanical, electromechanical, and electronic systems, such as computers. Many of such systems will have a component of which is computer controlled. Software is defined as the programming code tangible stored and residing in an electronic machine, such as a computer system, and which coded is executable or executing under normal conditions.

In the discussion below, in particular, the wallet holds a user's credentials. There are two types of credentials used herein. One type of credential is security credentials that are needed for access to a facility using system 10. A second type is expertise credentials that measure the level of talent of the holder that will be referred to below as expertise or level of expertise, so as not to confuse this with security credentials. In the discussion below a focus will be on user device 12a and wallet 13a.

The system 10 also includes a distributed ledger system 14. The distributed ledger system 14 is a sequential, distributed transaction database. An example of a sequential, distributed transaction database is the so-called "Blockchain" that operates with cryptocurrencies, such as "bitcoin"® (bitcoin project.org). The distributed ledger 14 rather than being dedicated to managing cryptocurrencies, manages PII transactional records and other types of records such as expertise records or level of expertise records rather than cryptocurrencies, and serves as the backend for a distributed access and talent verification system. The distributed ledger system 14 interacts with the user's wallet as well as third party systems to register user's and allow access to users to facilities. While sharing some similarities to the Blockchain as well as other known types of sequential transaction databases, the distributed ledger 14 has some significant differences.

Accordingly, the distributed ledger 14 has a structure as set out below. In some implementations of the distributed ledger 14, the system 10 also includes a service broker system 16 that is a third party service system that interfaces between the wallet 13a and the distributed ledger 14. In other implementations, the service broker system 16 is not needed.

From the distributed ledger 14 encrypted PII data and expertise level data upon request are transmitted to third party systems, as well as sending to third party systems listings of verifying systems, upon receiving access requests from the third party system. The service broker includes a hardware platform. For example, with a self-contained enterprise example, the Service Broker would include a hardware platform (e.g., a server computer system), a server operating system and a "calculator/attester algorithm" (discussed below). The "calculator/attester algorithm" would broker between the source and target peer-to-peer entities such that a minimal amount of information required to legitimize and execute an information exchange between the source and target is determined, exchanged, and validated so that a "transaction" can occur. The record of the transaction is written into the distributed ledger 14 with the minimum amount of PII or MII information, if any, including any metadata regarding the transaction or the information.

The system 10 also includes external systems 18. In some examples these eternal systems 18 are third party systems 18a. The third party system 18a can be any electronic system (or device) and is the system/device that seeks some aspect of the PII or other confidential information of a user or held by the user device 12a or expertise level data associated with the user. In the example discussed below the external systems is registration systems, i.e., guest management system 18a.

Talent and Attendance Verification

Consider that service is routinely performed in various commercial premises and on specific types of building automation equipment (such as HVAC, Access Control, Fire Detection, etc.) These services are performed on a routine basis and also when such types of types of building automation equipment experience problems or failures in operation of such equipment. The building owner would typically schedule the service, but heretofore would not necessarily have knowledge of the level of expertise of the service provider that is assigned to service the equipment. Moreover, absent functioning access control systems, the building owner would not necessarily have knowledge of the time of arrival of the service provider or how long the service provider was onsite. As used herein a service provider can be a technician or can be an organization that employs several technicians. These terms are used interchangeably below.

Typical processing for monitoring provisions of services to service requesters has a building owner or building owner system (or building management/system) detecting a malfunction or other fault, and sending a request for service to a service provider via a dispatch center using a commercial service product such as "MAStermind" (United Technologies, Inc.). For a typical service request, a work order is produced upon receipt of the request customer complaint and a technician visit to the premises is scheduled. This information is sent back to the guest management system.

Figure 1A:
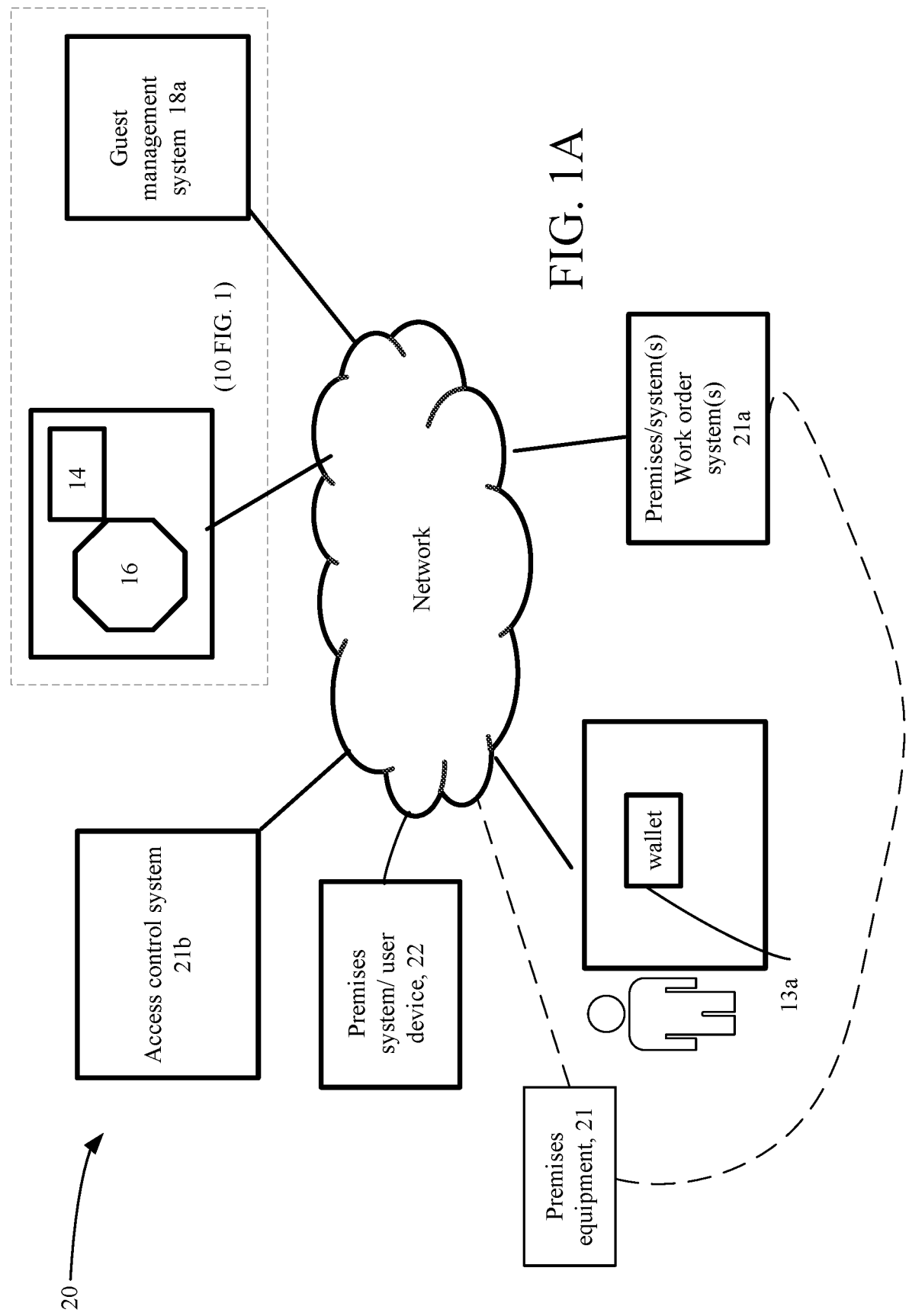
FIG. 1A is a schematic diagram of an exemplary system for talent and attendance verification employing a PII system such as FIG. 1.

Referring now to FIG. 1A, a networked arrangement 20 for monitoring provisions of services to service requesters is shown. The arrangement 20 will be described in reference to servicing of building automation equipment by service providers, technicians etc. The arrangement involves premises equipment 21 that may have networked connections (shown by dashed lines) to premises systems that monitor equipment health and/or work order systems 21a to automatically send requests for service. The premises equipment 21 may also be isolated from network connections to the server/work order systems and service requests are determined manually (not shown).

The arrangement 20 uses the distributed network IAM system 10 (FIG. 1) for access control, e.g., to control access control systems 21b, and extends the distributed network IAM system 10 to supply talent and attendance verification services, as will be described. The arrangement 20 includes systems 21a that manage "work orders." "Work orders" are generated to manage services provided to premises equipment/systems by service providers, e.g., technicians, etc. In the discussion below, a guest management system 18a is configured to determine whether a service provider/technician has a requisite or sufficient level of expertise that is required for the service of on-site systems/software, etc. and provides information regarding a time period that is customary for the work being performed. The arrangement also includes a server system or user device 22 that is in communication with the work order system 21a, and also the access control system 21b. The arrangement uses a reader or other device to access a user wallet 13a, as discussed in FIG. 1.

Work orders are tied to a guest visit, i.e., the service technician. The work orders contain information regarding the required time to arrive, conduct and complete service, a level of expertise and certifications required of the technician (e.g., various types of certifications such as equipment, e.g., HVAC (heating, ventilation and air conditioning) systems or computer systems or software on either equipment or computer systems) that are validated. These certifications and other work order information are validated using the guest management system, in conjunction with the IAM system 10, when the technician checks in to the guest management system 18a at the premises.

Figure 1B:
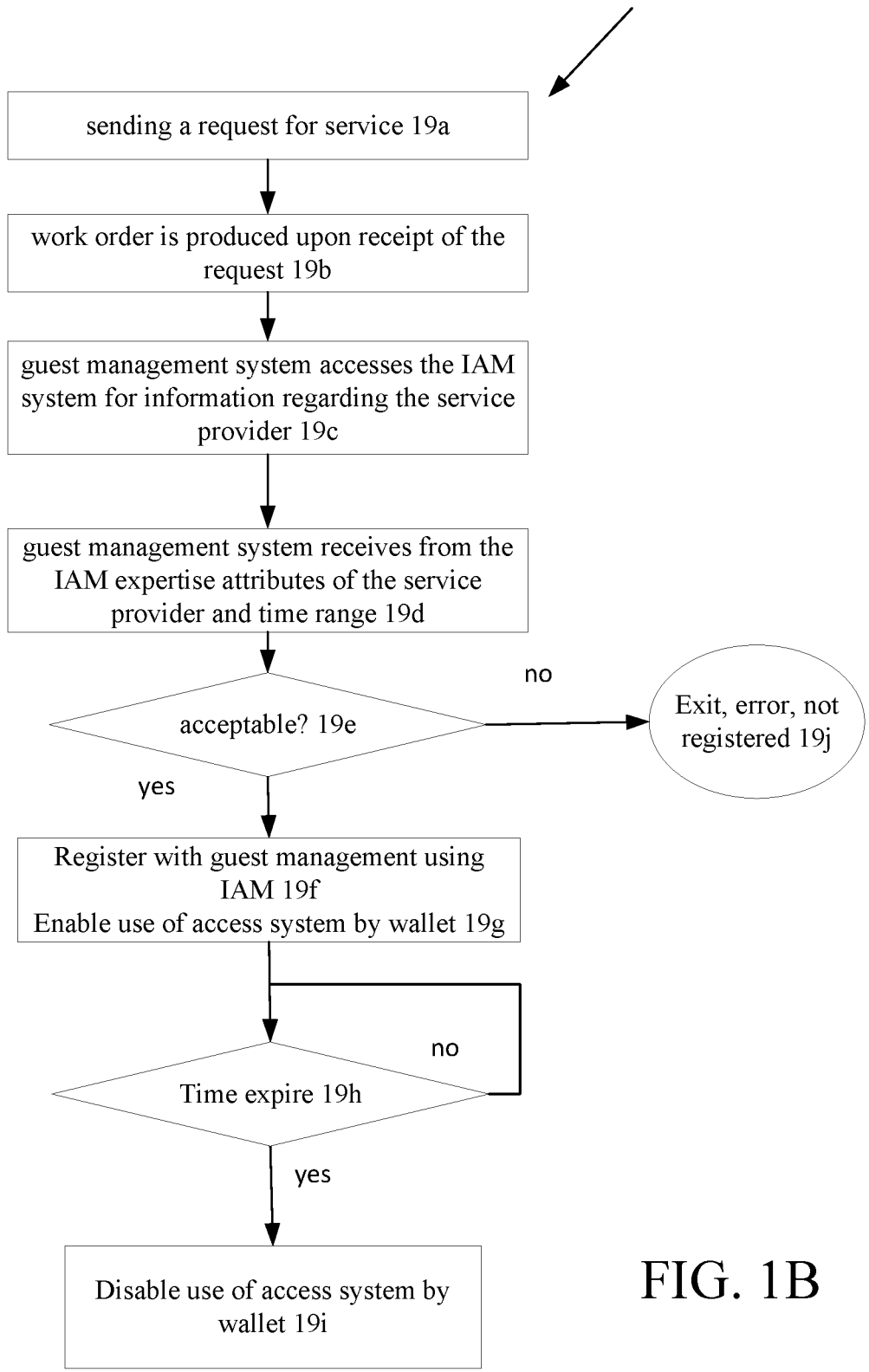
FIG. 1B is a flow diagram of service provisioning management processing.
Figure 13A:
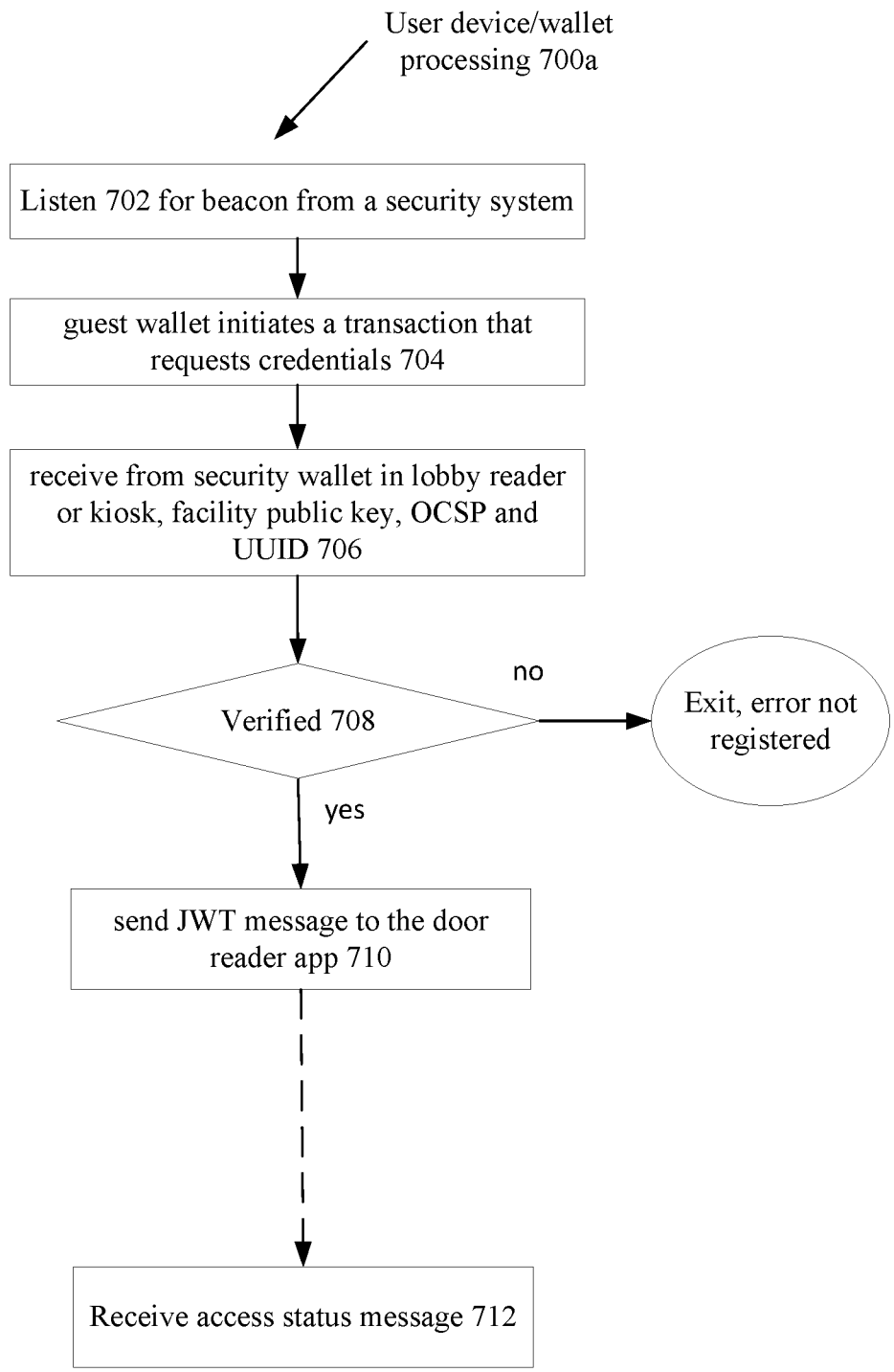
Figure 13B:
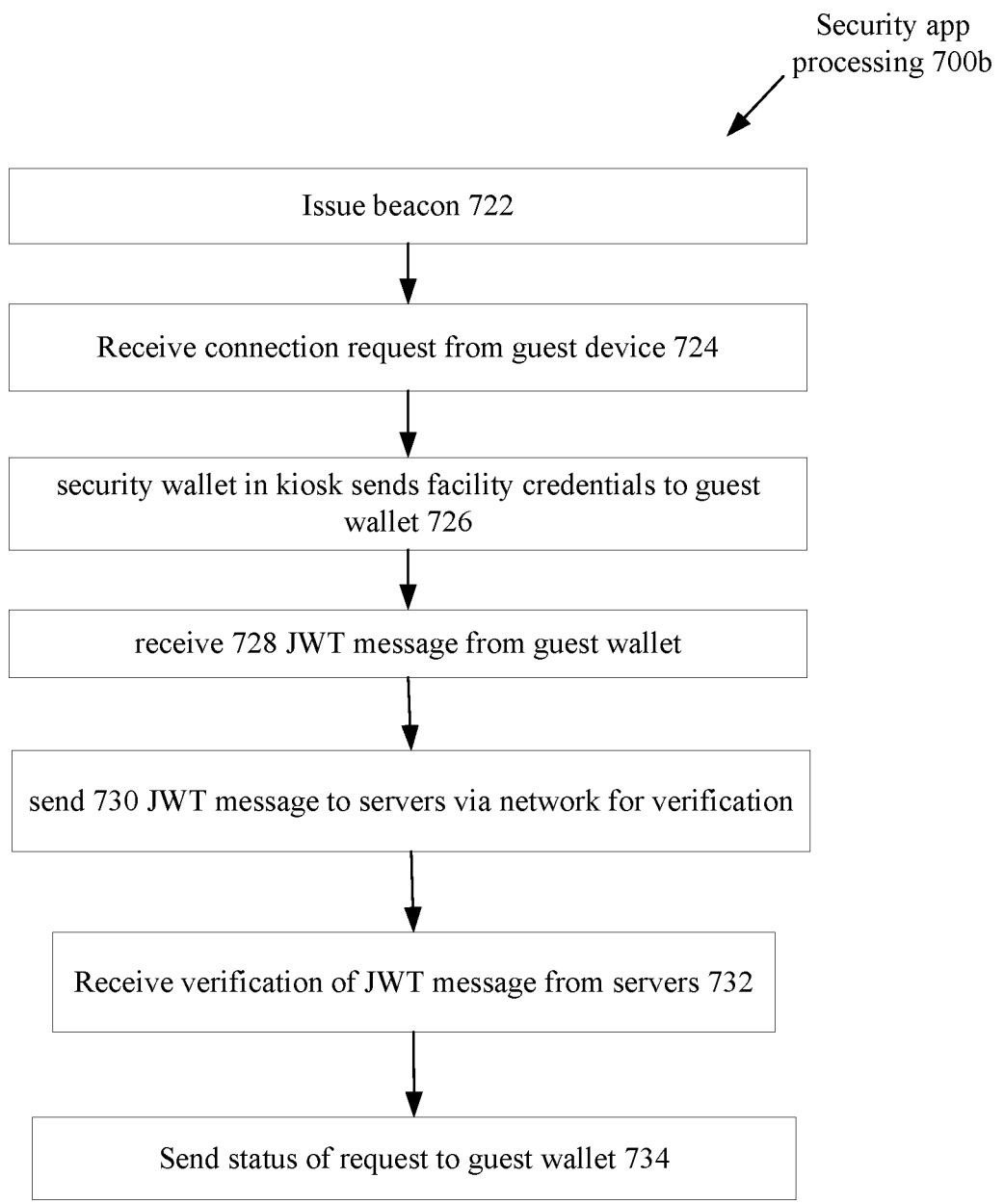
Figure 13C:
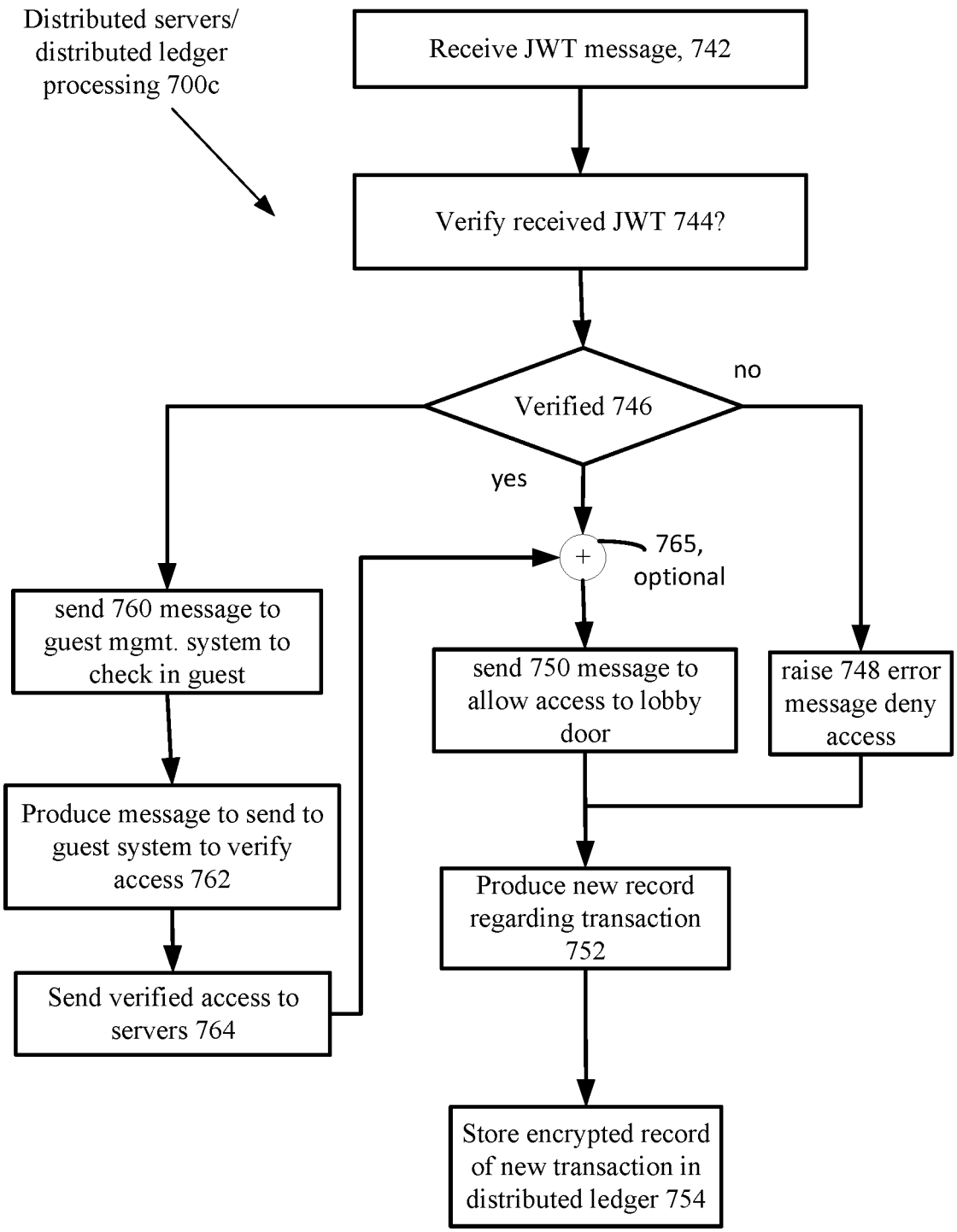

Referring now to FIG. 1B, an overall view of service provisioning management processing 19 is shown. Service provisioning management processing 19 includes sending 19a a request for service and upon receipt of the request by a work order system, a work order is produced 19b. An external system such as a guest management system 18 accesses 19c the IAM system 10 for information regarding a service provider listed in the work order. The guest management system 18 receives 19d from the IAM system 10 a set of expertise attributes associated with the service provider and a time range of an expected amount of time for completion of the service. The service provisioning management processing 19 determines if the set of expertise attributes are acceptable for the service task. If not the process exits 19j or requests a different service provider. If acceptable, the service provider will pre-register 19f with guest management system using the IAM 10 for pre-registration processing 24 (FIG. 2) and the service provisioning management processing 19 enables 19g use of an access system to the premises by a technician's wallet 13a using access processing (FIGS. 13A-13C).

Figure 2:
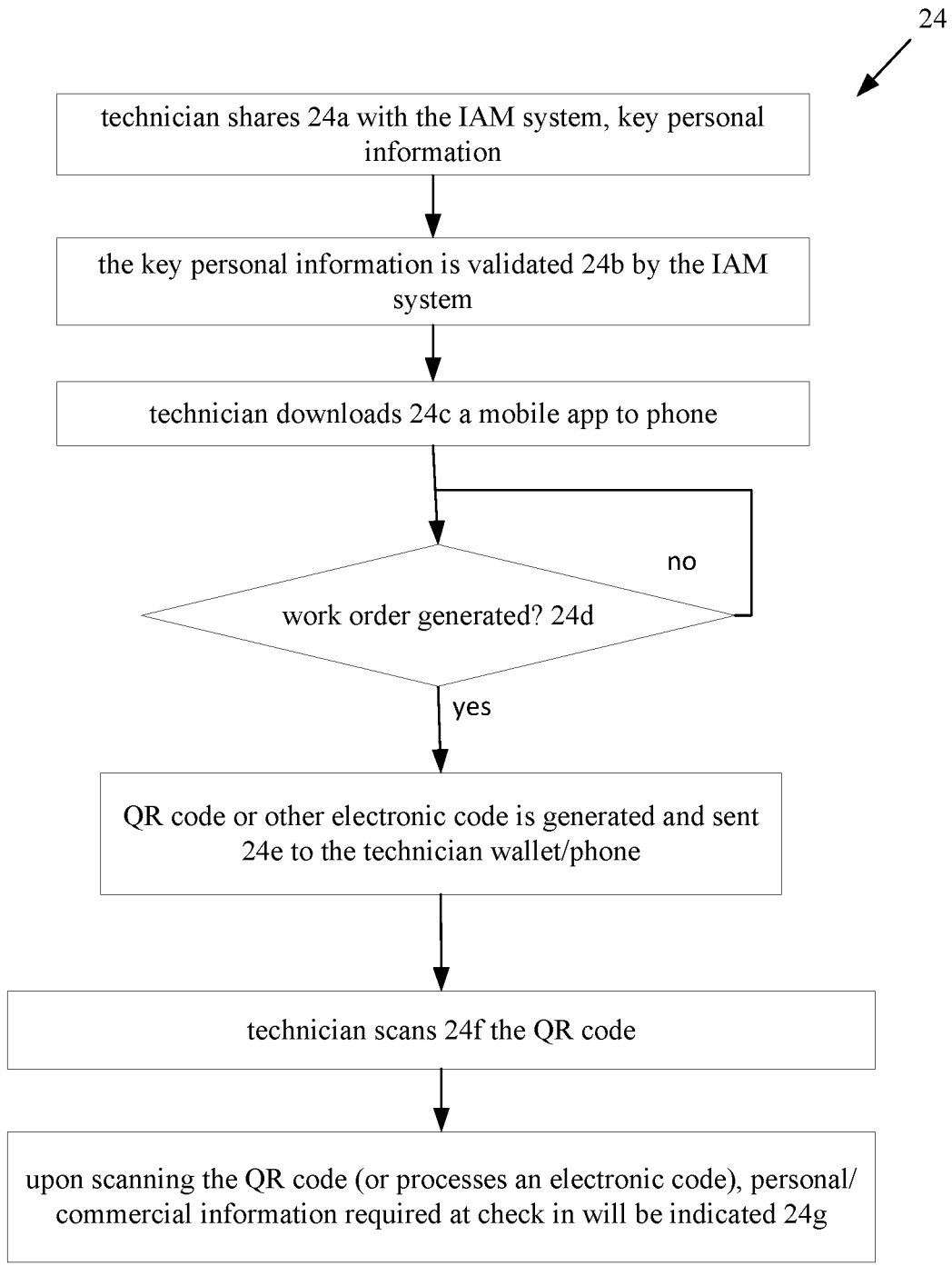
FIGS. 2-4 are flow diagrams of talent and attendance verification processing.

Referring now to FIG. 2, technician pre-processing 24 is shown. Generally, a technician will be pre-registered with a system that performs the talent verification/attendance processing, which in this example is the guest management system 18a.

Pre-registration can be before the work order is generated. As part of pre-registration the technician's device 12a, e.g., wallet 13a shares 24a with the IAM system 10 (FIG. 1), personal information that is validated 24b by the IAM system (i.e., with entities that are part of the distributed ledger 14 such as, for example, a governmental entity). An exemplary of pre-registration process is discussed below. The technician causes a download 24c of a mobile application to their device, e.g., smartphone 12a and the process tests 24d if a work order was generated. If a work order was not generated, the process 24 can wait till the work order is generated (or the process 24 can exit, raise an alarm, or take other action). When the work order is generated, a QR code or other electronic code is sent 24e to the technician's device 12a and/ or wallet 13a. The device can receive 24g a listing of the personal/commercial information that will be required at check in.

Figure 3:
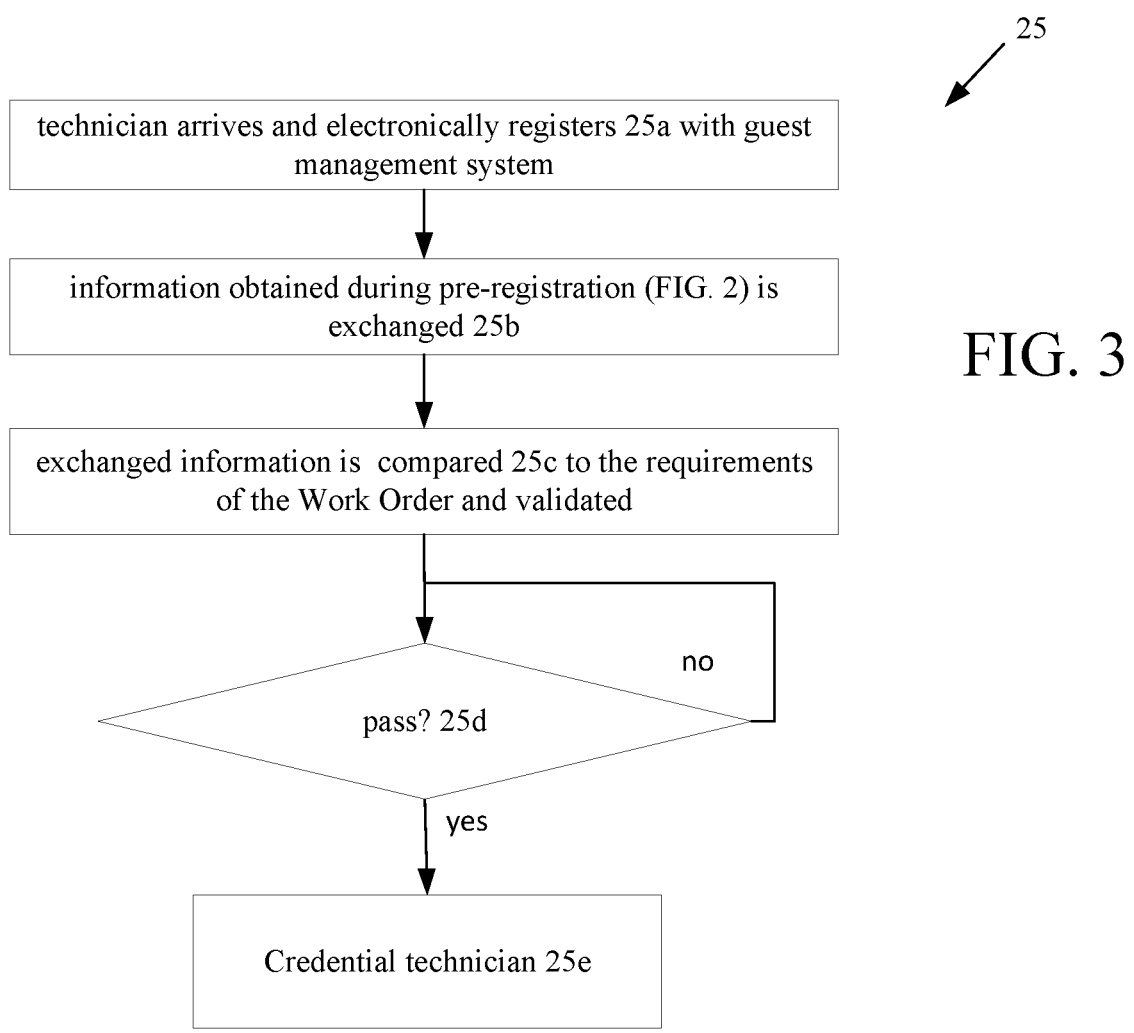

Referring now to FIG. 3, arrival processing 25 is shown. When the technician arrives and electronically registers 25a at, e.g., a front desk using the guest management system 18a, the information obtained during pre-registration will be exchanged 25b between the guest management system 18a and the technician's wallet. The exchanged information is compared 25c to the requirements of the Work Order and is validated on the block chain. When validated, the arrival processing 25 supplies the technician's wallet with proper credentials that allows the technician access to required areas of the facility and required systems/devices, etc. with requisite privileges as needed according to the work order. If exchanged information is not validated on the distributed ledger, the process 25 can wait for a manual intervention (or the process can exit, raise an alarm, or take other action).

The technician scans 24f the QR code or processes the electronic code. From the scan of the QR code (or processing of the electronic code) the technician's device accessing a security wallet (discussed below) of the security system, e.g., security application 188, an access QR code has embedded therein a facility public key.

In order for the guest management system 18a to validate information regarding the service provider, the guest management system 18a uses the IAM system 10 to verify information regarding the service provider(s). For example, in order to determine whether the service provider(s) have a requisite level of expertise required for the service, the guest management system 18a uses a process in which there is a required validation of PII data (as expertise data of either the service provider or the technician) through the distributed public ledger 14. The ledger 14 contains the information needed to validate the brokered information. The guest management system 18a sends 72 a lookup request to the distributed ledger 14 for a particular user's attribute, which in this case would be "expertise level" for a given "work order." The IAM provides the guest system 18 information regarding a time period that is customary for the work being performed associated with the work order.

When the service provider shows up, if the expertise level is acceptable the service provider is registered with the guest management system. In instances where the service provider does not possess the requisite expertise level that service provider could be notified beforehand by either the guest management system 18a or the dispatch center (not shown).

Requisite level of expertise is determined from the work order information that will indicate the level of expertise. The requisite expertise can be conveyed in various ways, such as through requisite attributes that can include required or preferred certifications, prior experiences, ratings (peer or customer types), educational level, etc. These requisite attributes are compared to attributes obtained from the IAM system for the particular service provider. Business rules that would be tailored to specific instances and specific entities would be executed to determine whether there was a sufficient match or an insufficient match. What would constitute "sufficient" would be determined on a case by case basis. Sufficient means in the context of this processing adequate for the task(s) required by the work order, and is determined through various techniques, such as expert guidance, or empirical determinations (experience/observation) based on the system(s) being serviced. Sufficient merely requires the existence of some type of comparison of attributes processing against a defined criterion or criteria with some resulting decision or outcome of the comparison.

In one example, pre-registration of a technician of a service provider is accomplished via the wallet 13a on a user device with third party system 18 as a guest management system (as described below).

Figure 4:
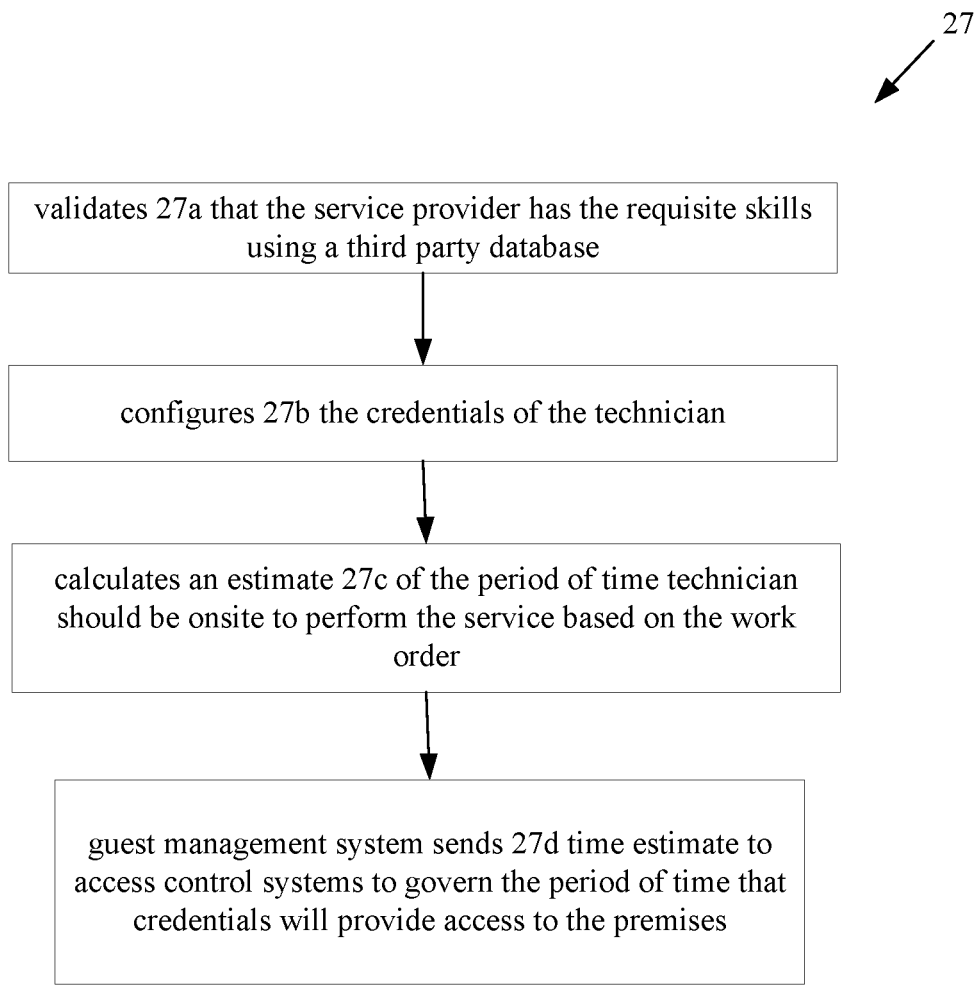

Referring now to FIG. 4, credential processing 27 is shown. The guest management system 18a validates 27a that the service provider has the requisite skills using a third party database that accesses records regarding registered work credentials etc. Upon validation, the credential processing 27 configures 27b the credentials of the technician to only allow access to those parts of a building management system (BMS) database required to handling services under the work order. Credentials are used to provide the technician an authenticated access level for just the area of the system and facility the technician needs to work on. This will secure the BMS from unauthorized entry and access to other areas of the BMS system. To accomplish this when the work order is formulated, the end user defines what can be worked on (equipment, modules, software modules, etc. whether at a high or low level of granularity) and those that are not specified cannot be worked on or a specific list can be specified that the technician does not have access to. These attributes are written into the "token" or attribute of the visiting technician when the technician logically logs on to the BMS system.

The tokens are determined in reference to the work order by examining the nature of the systems that the technician needs access to and the locations of those systems. Two types of tokens are generated. One type is of a security access type (allowing access through specified doors or in specified areas) and the other is equipment access type (allowing access to specific pieces of equipment or specific portions of software, etc.).

The guest management system 18a also calculates an estimate 27c of the period of time that the person should be onsite to perform the service based on the work order. The guest management system is also connected to the access control system, using the time estimate, the guest management system sends 27d the estimate to the access control system that places an entry in an access control list that governs the period of time that credentials given to the technician will provide access to the premises.

The guest management system using the estimate of the period of time that the person should be onsite to perform the service based on the work order will configure the access control system, using the time estimate, to place the entry in the access control list to govern the period of time that the badge will provide access to the premises. In some implementations, doors that the technician needs access are tied to the work order, i.e., if the technician needs to work on the boiler, the technician's credentials will only provide access to those doors related to that equipment. A similar concept of access can apply to control aspect software module access.

The systems function together based on information contained in the "work order." Work orders are records that are supplied via a vendor generated data feed. Commercial service products such as "MAStermind" (United Technologies, Inc.) help service customer work orders. For a typical service request, a service dispatch center in a physical location produces a work order upon receipt of a customer complaint and schedules a technician to visit the premises. The visiting technician inspects the premises and updates service center personnel about the problem. The work order is updated with the correct job cause(s)/description(s) and time(s). The technician may perform several tasks and when the job is completed an appropriate job resolution description is selected for the job and comments from technicians or the service center personnel are added as free text.

Figure 5:
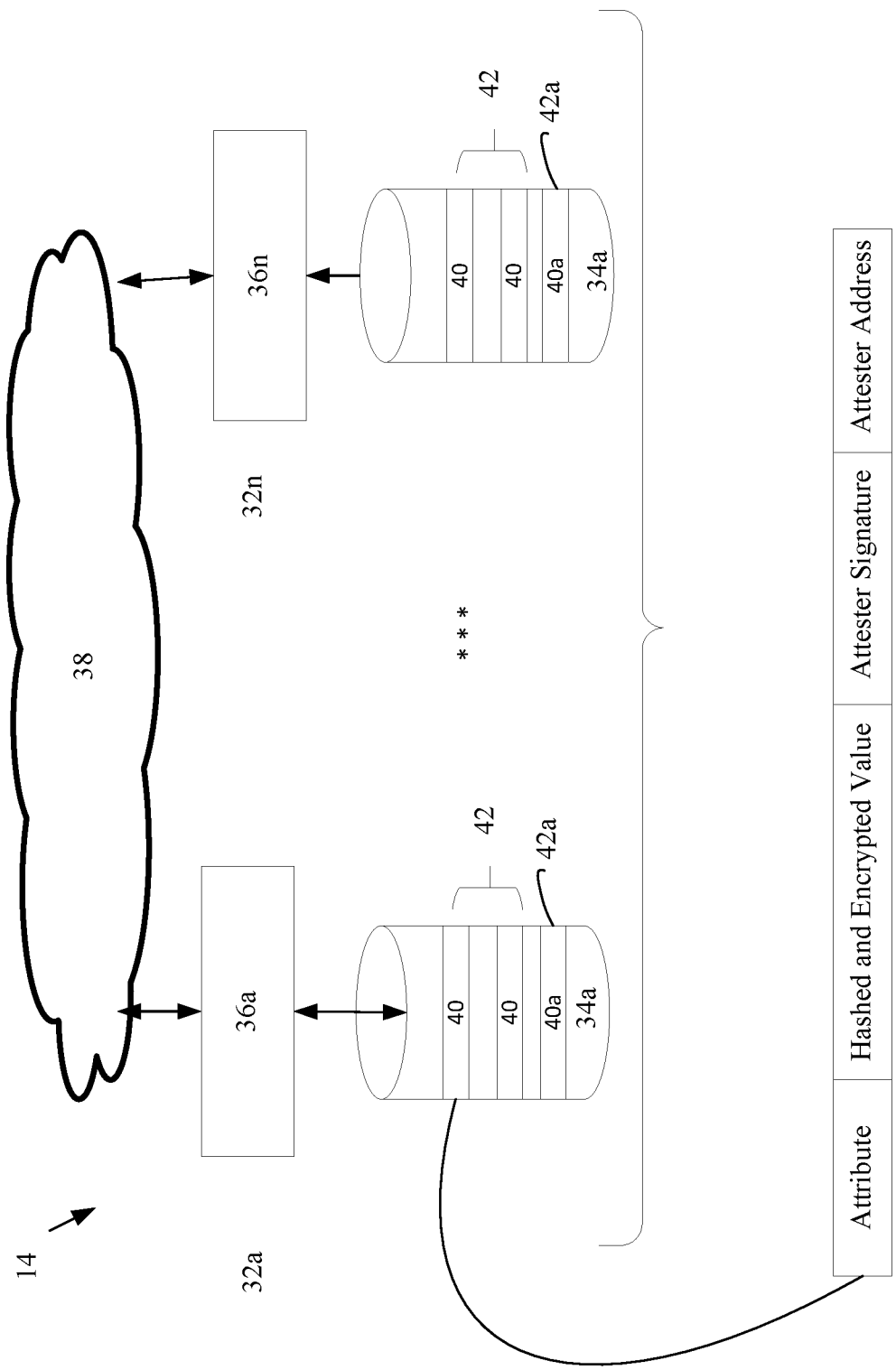
FIG. 5 is a block diagram of a distributed ledger.

Referring now to FIG. 5, the distributed ledger system 14 is shown. As mentioned, the distributed ledger system 14 is a sequential, distributed transaction database. The distributed ledger system 14 thus includes distributed databases 32a-32n that are typically existing in the "Cloud." The distributed database comprise storage devices 34a-34n that are attached to different interconnected computers 36a-36n. The distributed databases are controlled by a distributed database management system that controls storage of data over a network 38 of the interconnected computers and execute corresponding replication and duplication processes. Replication software (not shown) detects changes in the distributed database contents and once the changes have been detected, replicates the changes to have all the databases the same. Duplication software (not shown) identifies one database (not shown) as a master and then duplicates that database across other databases. Replication and duplication keep the data current in all distributed storage locations.

Each of the distributed databases 32a-32n that form the distributed ledger system 14 store encrypted information records. Typically the records will be a hash of an information record or a hashed pointer to an information record. In theory, assuming that the distributed databases 32a-32n could be hacked, a hacker will not access the actual data in information records, but only a hash of the actual data. An exemplary record 40 is shown below. The record 40 is stored in each of the distributed databases 32a-32n that form the distributed ledger system 14, which stores the record 40 in an encrypted form in the distributed ledger system 14. Record 40 has a structure that includes an attribute type, a hashed and encrypted value of the attribute, an attester's digital signature of the hashed and encrypted value and the attester's address. An exemplary record format is set out in table below.

| User Attribute | Hashed and Encrypted Value | Attester Signature | Attester Address |
|---|---|---|---|
| Attribute | encrypt(attribute) | Signature of encrypt(value) | Address |

An exemplary set of records is set out in table below. A set 42 of such records 40 can correspond to a user's profile. This set 42 (or profile) is added to with new records as new attributes of the user are added to the distributed ledger system 14.

| User Attribute | Hashed and Encrypted Value | Attester Signature | Attester Address |
|---|---|---|---|
| Citizenship | encrypt(USA) | Signature of encrypt(USA) | attst@cadmv.com |
| Current Age | encrypt(age) | Signature of encrypt(age) | attst@cadmv.com |
| Home Address | encrypt(address) | Signature of encrypt(address) | attst@cadmv.com |
| Height | encrypt(height) | Signature of encrypt(height) | attst@cadmv.com |
| Access credentials | encrypt(credentials) | Signature of encrypt(credentials) | secure@serv.com |
| * | * | * | * |
| * | * | * | * |
| * | * | * | * |

One can readily observe that what is stored in the distributed ledger system 14 is information about a user's attribute, a hash of that attribute, information about an attester to the attribute, which information is attester signature system, and attester address. The attester when contacted can attest to the requested information being valid. For example, given a user's birth certificate that is issued by a state governmental agency that state governmental agency converts the birth certificate to a digital file of the document, and that digitized file of the document is hashed to provide a hash of the digitized birth certificate document. Rather than the document itself being stored (or the digitized document being stored, what is stored is the hash of the digitized birth certificate document, that is stored in a user's profile in the distributed ledger 14.

As mentioned, the distributed databases 32a-32n that form the distributed ledger system 14 also store encrypted expertise level records, An exemplary record format of an expertise level record is set out in table below.

| User Id | User Attribute | Hashed and Encrypted Value | Attester Signature | Attester Address |
|---|---|---|---|---|
| User A | Attribute | encrypt(attribute) | Signature of encrypt(value) | Address |

An exemplary set of records is set out in table below. A set 42a of such records 40a can correspond to a user's expertise profile. This set 42a (or expertise profile) is added to with new records as new attributes of the user are added to the distributed ledger system 14.

| User ID | User Attribute | Hashed and Encrypted Value | Attester Signature | Attester Address |
|---|---|---|---|---|
| user_a | Education level | encrypt(ed level) | Signature of encrypt(USA) | attst@cadmv.com |
| user_a | Certification 1 | encrypt(cert 1) | Signature of encrypt(age) | attst@cadmv.com |
| user_a | Certification 2 | encrypt(cert 2) | Signature of encrypt(address) | attst@cadmv.com |
| user_a | Certification n | encrypt(cert n) | Signature of encrypt(height) | attst@cadmv.com |

-continued

| User ID | User Attribute | Hashed and Encrypted Value | Attester Signature | Attester Address |
|---|---|---|---|---|
| user_a | Years of experience | encrypt(years) | Signature of encrypt(credentials) | secure@serv.com |
| user_a | * | * | * | * |
|  | * | * | * | * |
|  | * | * | * | * |

When the guest management system 18a seeks expertise of the user, the user system/device 12a sends the guest management system 18a the actual certification(s), etc. The receiving party generates the hash of the certification(s) and validates that the hash exists in the distributed ledger 14. As, the requesting system 18 generates the hash of that record(s), e.g., the certification(s), and accesses the hash from the distributed ledger 14, and the requesting system 18 needed only retrieve from the distributed ledger system 14, the signature for the entity that signed that hash. The distributed ledger system 14 stores the "Attester Signature and the "Attester Address." The requesting system determines whether the stored "Attester Signature and the "Attester Address" can be trusted. If the requesting system determines that the Attester is trusted, the requesting system can verify the document was signed by the Attester, and is assured that hash of the document received by the requesting system from the wallet is authentic, as the same document attested to by the Attester.

Within a domain, distributed ledgers exchange information to maintain identical ledgers, with any suitable so called sequential transaction database technology of which "Blockchain" technology is but one example. However, unlike some electronic currency based technologies, e.g., bitcoin, where the Blockchain is designed so that no entity controls the Blockchain in some examples disclosed herein using the techniques disclosed herein the transaction database technology actually exchanges information within a domain and because such domains could be private transaction databases, each entity or industry could structure the transaction database as different private transaction databases.

Figure 6:
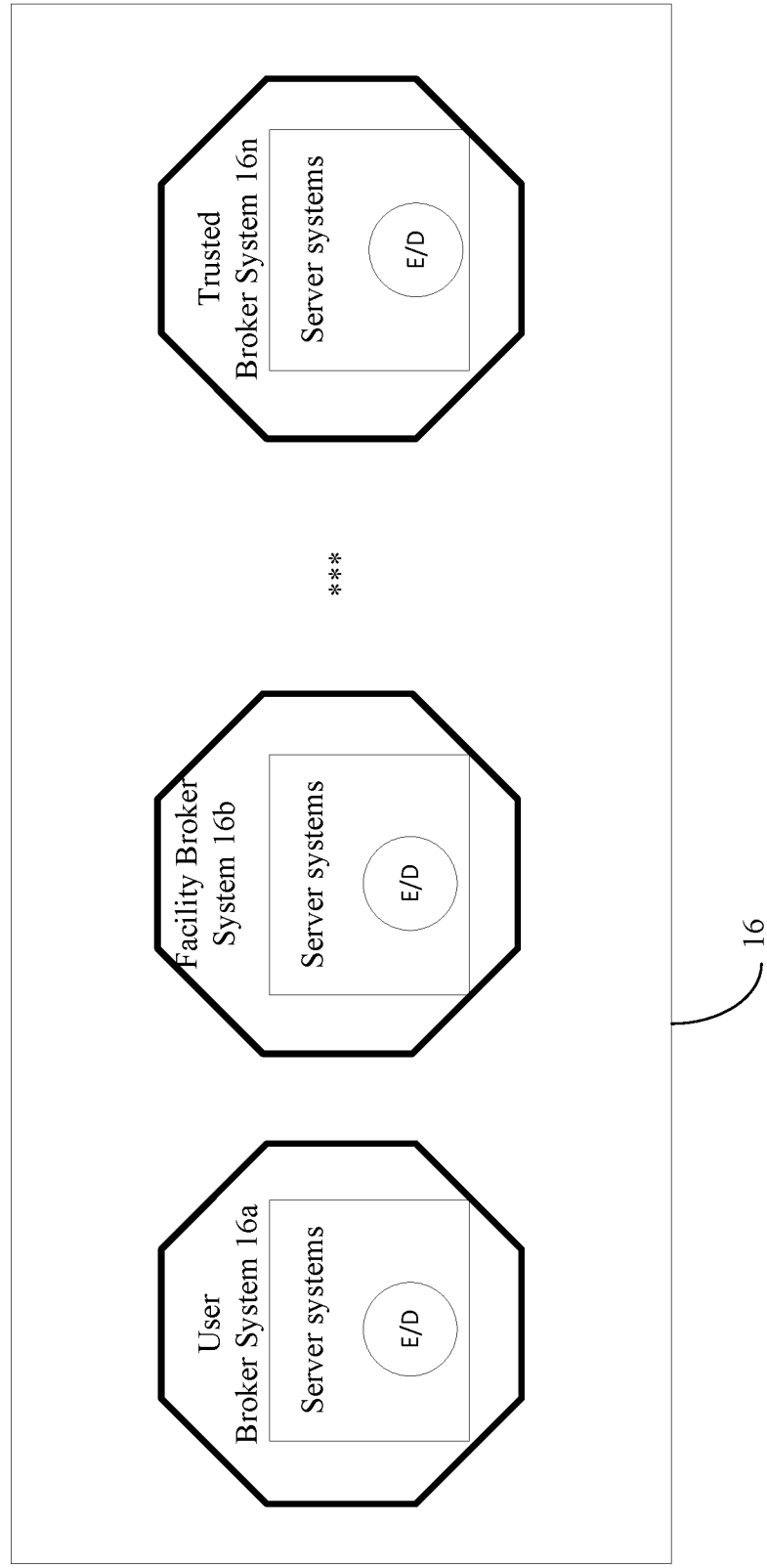
FIG. 6 is a block diagram of a broker system.

Referring now to FIG. 6, the broker system 16 is shown. The broker system 16 includes a computer system and executes software that handshakes between the user system 12 and the vetting agent or attester. Rather, than the user device 12a accessing the distributed ledger 14, all requests for transactions between the user device and the requesting device occur through the broker system 16. For some transactions, the broker system 16 accesses the distributed ledger system 16, whereas in other transactions the requesting system 18 accesses the distributed ledger system 16.

As shown in FIG. 6, the broker system 16 can be a compilation of many such broker systems 16a-16n. Each of the broker systems 16a-16n can comprise computer systems and associated distributed databases. The broker systems 16a-16n are distributed over a network of servers that act together to manage the distributed ledger 14. All attribute hashed values, attester information, etc. are stored in the distributed ledger 14 and as the flow diagram below will show the broker systems 16a-n are configured to access the distributed ledger 14 to obtain and validate such information. Also shown in FIG. 6, are the encryption and decryption (E/D) of data flows that take place between the broker systems 16a-n and wallets 13a.

Note that in the context of a private distributed ledger environment, for an enterprise, it may be desirable to not have a query sent to the attester database for each transaction. Rather, a business rule could be established that once a validation event has occurred, then it is good for a period of time, until the attester database is updated etc., so as to reduce latency.

Figure 7:
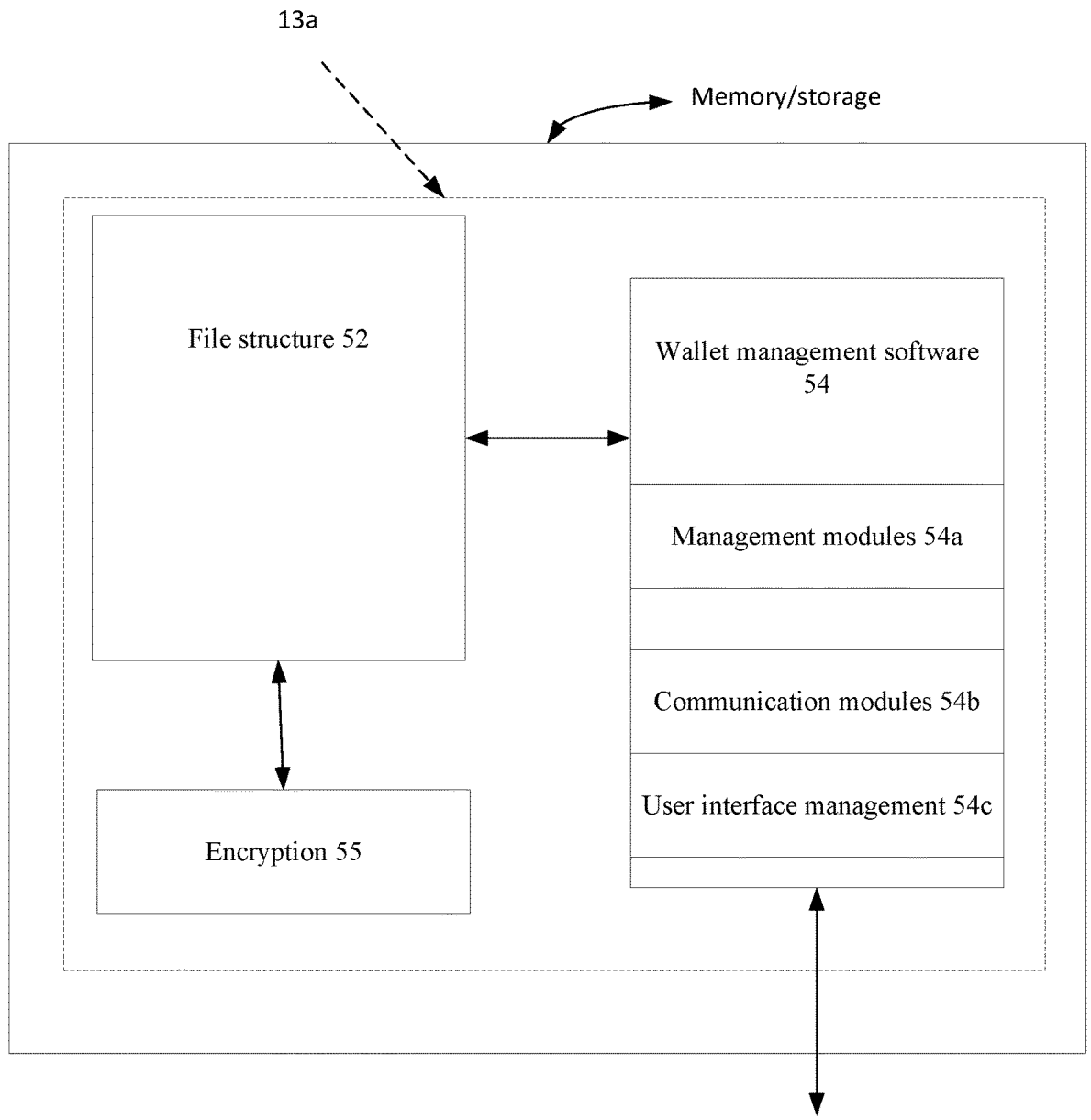
FIG. 7 is a block diagram of an identity wallet.

Referring now to FIG. 7, the wallet 13a is shown. The wallet 13a includes a file 52 structure and wallet management software 54 that are stored on a user device 12a (FIG. 1). In addition to the software comprising management modules 54a that handle request and access to the file structure, as well as receiving user authorizations, etc., the software also includes communication modules 54b that exchange information between the wallet and requestor systems, and between the wallet and the broker system 16 (when used) and that receives requests for information that result in messages being displayed on the user device 12a.

The wallet 13a stores information for handling a third party request for data directly from a user that transmits that information directly from the wallet 13a to the third party system 18 in a secure manner. The wallet 13a may take several form factors—a physical ID Wallet such as a credit card, smart wearable etc. or it may only need to be the software payload that a system pushes out to a commercially acceptable mobile device such as a smartphone. In some implementations, the wallet needs to be in communication with a device that can perform calculations/determinations, as will be discussed below.

The wallet 13a has the management module 54a that handles third party requests for information and/or attributes and the communication module 54b that interfaces with the broker system 16. The wallet 13a includes a module 54c that allows a user to view the request and either approve, all or part of none of the request. Upon approval (partial or all) of the request, the wallet 13a encrypts via encryption module 55 the requested information using a public key infrastructure (PKI) where a public key of the third party is used along with one the private keys associated with the wallet 13a to encrypt the data. The encrypted data can either be sent to the user's broker system 16 or the wallet 13a can look up the direct address of the third party system 18 and send the encrypted data directly to the third party system 18, depending on the implementation of the system 10.

As known, a public key infrastructure (PKI) is a set of hardware, software, people, policies, and procedures needed to create, manage, distribute, use, store, and revoke digital certificates and manage public-key encryption. The purpose of a PKI is to facilitate the secure electronic transfer of information for a range of network activities such as e-commerce, internet banking and confidential email. PKI is required for activities where simple passwords are an inadequate authentication method. In cryptography, PKI binds public keys with respective user identities by means of a certificate authority (CA) within a CA domain. The user identity is unique within each CA domain.

Figure 8:
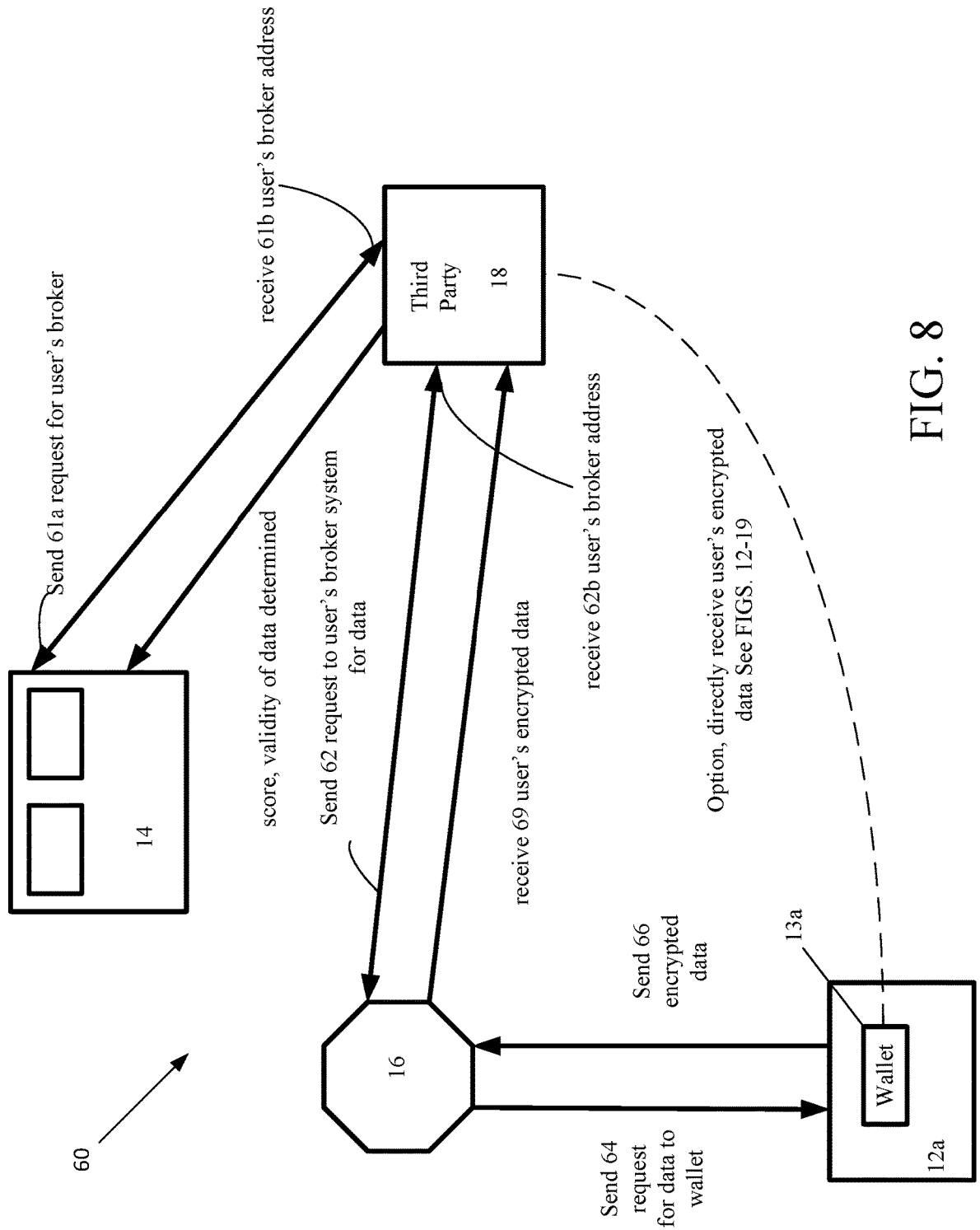
FIGS. 8-10 are block diagrams for message exchange processes.

Referring now to FIG. 8, a diagram of a process 60 and flow for the process 60 where the guest registration system 18a requests information from the user system 12a. In this case, the broker system 16 provides an asynchronous transfer between the user device 12a and the third party device 18. The third party device 18 sends a message request 61a to the distributed ledger 14 for the user's broker system. In general, there can be many such broker systems associated with many users. The third party device 18 receives 61b a message that includes an address of the user's determined broker, as received from the distributed ledger. (In the following figures, as needed, double arrowed lines and reference characters on tips of such arrows are used to denote paired messages, such as sending and receiving messages.) In other implementations, the address lookup can also go through the exchange network.

In an implementation that uses a broker, the third party device 18 (security system discussed below) sends 62 a message to the user's determined broker 16, which message includes a request to access data on the user's wallet 13a. The request for data is sent 64 from the broker system 16. A "score" is calculated for determining the validity of the data (rather than being a measure of the secure transmission of the data). A scoring algorithm can be based on the number and types of attesters, etc., to the user's wallet 13a on device 12a. Various algorithms can be used such as one that weights types of attesters and number of attesters and normalized these to a standard. Thus, a score generated with a large number of highly trusted attesters would be higher than a score generated with a large number of attesters having a low level of trust. An alternative to this type of score is an attester score based on the type of attester and how trustworthy the attester is and has been. For example, see the following table.

| Score | Number of attesters of high trust | Number of attesters of moderate trust | Number of attesters of low trust |
|---|---|---|---|
| 0-10 | 0 | 0 | No more than X |
| 11-20 | 0 | 0 | Greater than X less than Y |
| 21-40 | 0 | At least M | *  |
| * | * | * | * |
| * | * | * | * |
| * | * | * | * |
| 91-100 | At least Z | | |

One algorithm, as in the table above, is a mapping scheme that maps a score range (or values) to various slots based on empirically determined number of attesters (M, X, Y, Z) and empirically determined trust levels (high, moderate, low). This could be an example of a score for an item. Thus, with an item could be stored the number of and types of attesters of various categories (three of which, low, moderate and high trust levels being shown) or the score range or value.

Other scoring algorithms such as weighted algorithms could be used, such as one of the form:

Score=$((H*W_h+M*W_m+L*W_h)/total)/Normalized$

Where H is the total of high trusted attesters
  M is the total of moderately trusted attesters
  L is the total of low trusted attesters
  $W_h$; $W_m$; $W_h$ are empirically determined weights, and Normalized is an optional normalization function or value.

The user's wallet 13a (or other application or user via a physical action using a user input device) either answers (yes or no) or simply ignores the message. When the answer is yes, the user's wallet 13a (or other application) encrypts the data using an asymmetric encryption algorithm that uses the requestor's public key. The encrypted data is sent 66 from the user's wallet 13a to the broker system 16 so that only the two endpoints (user's wallet 13a and the third party system 18) can read the actual data. At the broker 16 system, upon reception of the encrypted data from the user's wallet 18a, the broker system 16 sends the data to the third party system 18.

In another implementation, the data would be sent directly to the requestor's wallet without the broker system 16. This implementation can be especially used with the processes discussed below. In the processes below, this direct approach is used in the explanations of those processes.

Figure 9:
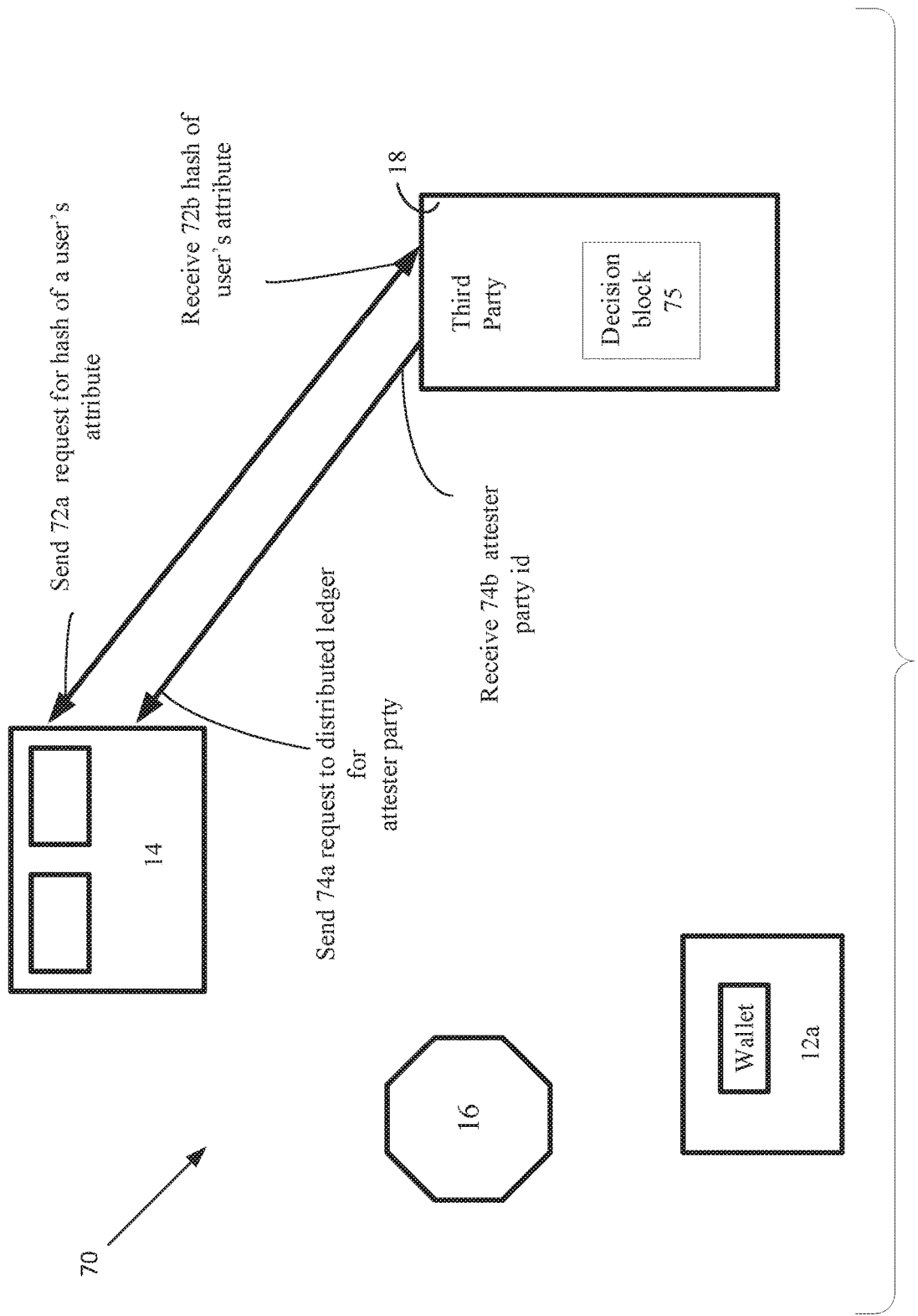

Referring now to FIG. 9, another process 70 is shown in which there is a required validation of PII data (or expertise level data) through a distributed public ledger 14. The distributed ledgers can be public, meaning that anyone can place and/or access data in the ledger or private, meaning that only authorized individuals and entities can place and/or access the private type of ledger. Thus, generically, such distributed ledgers 14 can be public or private depending on various considerations. In either instance, the ledger 14 contains the information needed to validate the brokered information. The third party system 18 sends 72 a lookup request to the distributed ledger 14 for a particular user's attribute.

In FIG. 9, the broker 16 and wallet 13a and user device 12a are not directly involved, but are shown. The lookup request is actually for a hash of the desired user's attribute. The distributed public ledger 14 receives the request and accesses the hash of the particular user's attribute and returns 72b that hash to the third party system 18. The third party system 18 sends 74a a look up message request for the system that has attested to the hash of the particular user's attribute stored in the distributed public ledger 14. The third party system 18 receives 74b the identity of the system that performed the attestation to the hash of the particular user's attribute, and makes an independent decision 75 on the validity of the hash of the particular user's attribute. For cases where privacy of the data is a concern this case assumes that the third party system has the user's public key, as the attribute data is encrypted. For other types of data where privacy of the data is not a concern, the attribute need not be encrypted.

Note, in addition to returning the attester information, the system could return the attester score of that attester having the highest score. The score could be calculated by the distributed ledger 14, but may be more appropriately calculated by the broker system.

Figure 10:
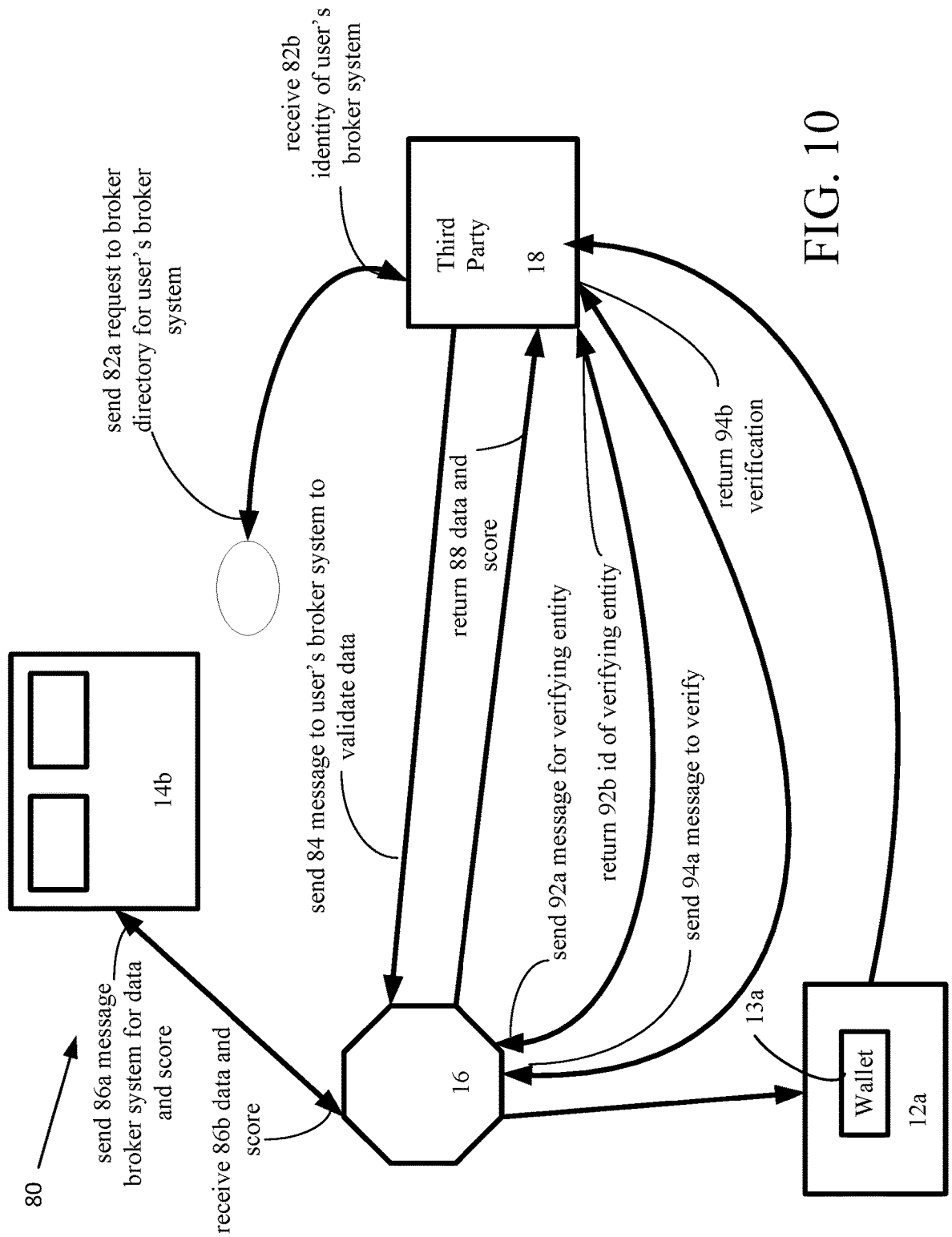

Referring now to FIG. 10, another process 80 is shown in which there is required validation of data through a private distributed ledger 14b. The third party system 18 sends 82a a message to a broker directory system 15 to locate the user's (technician's) broker system. The broker directory system 17 determines the technician's broker system and sends 82b a message to the third party system 18, which includes the identity of the technician's broker system. The third party system 18 sends 84 a message to the determined broker system 16, which is a request to the technician's broker system 16 to validate data and return score data. There are many algorithms that could be used for scoring. For example, a simple algorithm may assign a score to an attester as high, when the attester is a governmental agency and may score an attester as lower when the attester is a personal contact. The technician's broker system 16 validates data by sending 86a a message to the distributed ledger 14b for the data and the score (of the data or the attester). The broker receives 86b from the distributed ledger 14b a message including the data and the score(s). The technician's broker system 16 returns 88 the score(s) and status back to the third party system 18.

One approach for a private enterprise would be for an enterprise to define business rules that govern source attester scores. The rules could be absolutes. Alternatively, over time the system that determines the score builds "a transactional footprint" for transactions, which is based on physical access points, logical access points, time of day, duration of use, etc. used with a transaction record. Initial algorithms are determined at the initial deployment, and then are refined based upon a regression pattern(s) that emerges.

Optionally, the third party system 18 requests 92a a lookup of the broker/owner for the party that verified the data. The third party receives 92b the address of the broker/owner that verifies the data. The broker/owner system that verifies the data signs the data with its digital signature. The broker/owner system sends 94a a message to the verifying broker/owner to verify a signature of the signed data. Upon receiving 94b a verification from the verifying broker/owner system, the third party system has verification of the data without actually having accessed the data. Optionally, the user can share 96 the data to be validated with the third party directly from the user's wallet.

Another process (not shown) can be used in which a third party requests validation of an attribute without actually disclosing the attribute. In this process the wallet 13a does not send a hash of the attribute, but allows a third party to request the verification of the attribute from the exchange. The rule is submitted to the exchange of the technician (i.e. the request to validate if a technician has a certain certification or an absence of a criminal record). The user would authorize the exchange for this rule to be processed. A trusted party attests to the certain certification or lack of a criminal record.

Credential-Based Registration System

Described below are aspects of a mobile credential that is fully integrated into an access control system and configured with respect to a work order to make permission decisions, provisioning privileges, etc. The mobile credential is stored in a user's wallet 13a and is identified as authentic by use of the distributed ledger 14. The distributed ledger 14 is used to supply secure credentials to the user's wallet 13a all of which have been validated by the distributed ledger 14. The mobile credential is used to produce an access token that has a finite lifespan that is determined according to the estimate provided by the system of FIG. 4, and which can be adjusted. With the processes described below, the reader system can verify the access token as authentic and being from the user, and the user's wallet 13a can verify the facility as the facility to which the user should exchange credentials.

Figure 11:
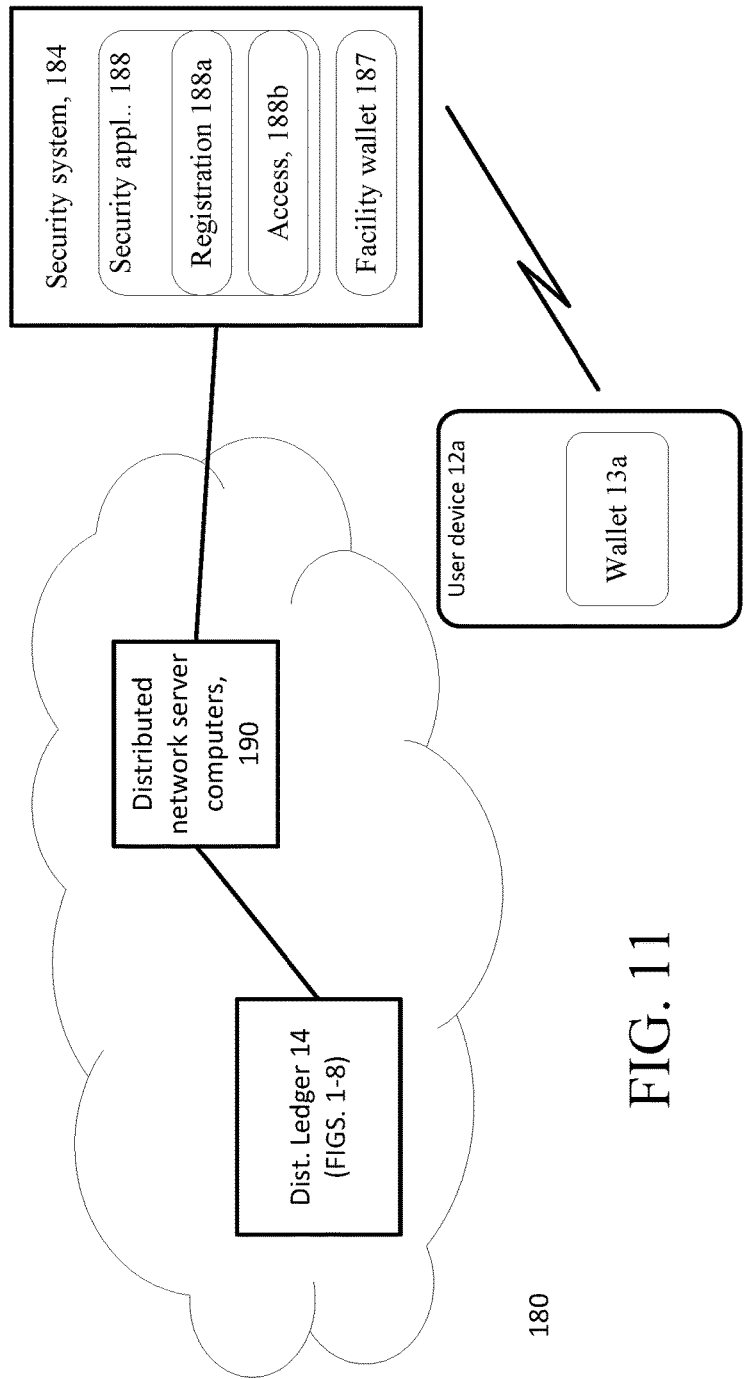
FIGS. 11 and 12 are block diagrams.

Referring now to FIG. 11, a credential-based registration/access system 180 that is a specialization of the system of FIG. 1, without the use of a broker system, is shown. The credential-based registration/access system 180 (registration/access system 180) is used for registration of a mobile credential with an access control system (not shown) using registration process 188a, the details of which will be discussed below. The registration/access system 180 includes the user device 12a having the wallet 13a. It is understood that a practical implementation would in general involve many such user devices/wallets of many users. The user device 12a and wallet 13a will be registered with the access control system and verified for use with the access control system. The registration allows a specific facility as well as any facility of the same entity to be registered by the mobile credential (if so desired by the facility owner). Additionally, the registration allows a specific facility as well as any facility of the same entity to be verified by user device prior to the user device exchanging any mobile credentials with the facility.

The credential-based registration/access system 180 (system 180) also includes a facility security system 184 including a facility security wallet 187 and a facility security application 188 that together with the user device 12a registers and verifies users, e.g., employees of an entity controlling the physical premises or logical structures, by use of the distributed ledger 14 and the distributed network server computers 190. The user device and the security system can be any type of computing system, computing station, computer server, tablet device, etc., that includes Bluetooth® or other near field communication capabilities that can send out a beacon signal, as discussed below. The security application 188 causes the security system 184 to continually or periodically issue the beacon that is readable by the technician device 12a to initiate a transaction with the security system 184.

Figure 12:
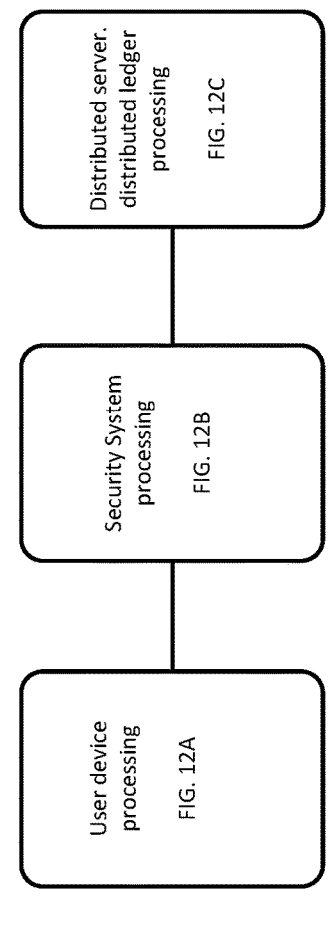

Referring now to FIG. 12, a credential-based registration process flow 200 for registration of a mobile credential stored on the technician device 12a (more specifically in the wallet 13a) with access control systems is shown. Shown in FIG. 12, are technician device processing (FIG. 12A), security system processing (FIG. 12B) and distributed system/distributed ledger processing (12C). This credential-based registration process flow 200 (registration process 200) is shown for the technician device 12a/wallet 13a, security system 184/security application 188, and the distributed servers 190 that interact with the distributed ledgers 14. The registration process 200 allows a technician to verify a facility and allows any facility of the same entity to be registered by the mobile credential. The registration process flow 200 also allows the access control system to verify the identity of the technician possessing the mobile credential for permitting registration for access to the facility (or facilities). The described registration process 200 uses the security application 188 to register and verify technicians, e.g., employees of an entity controlling the physical premises or logical structures.

Figure 12A:
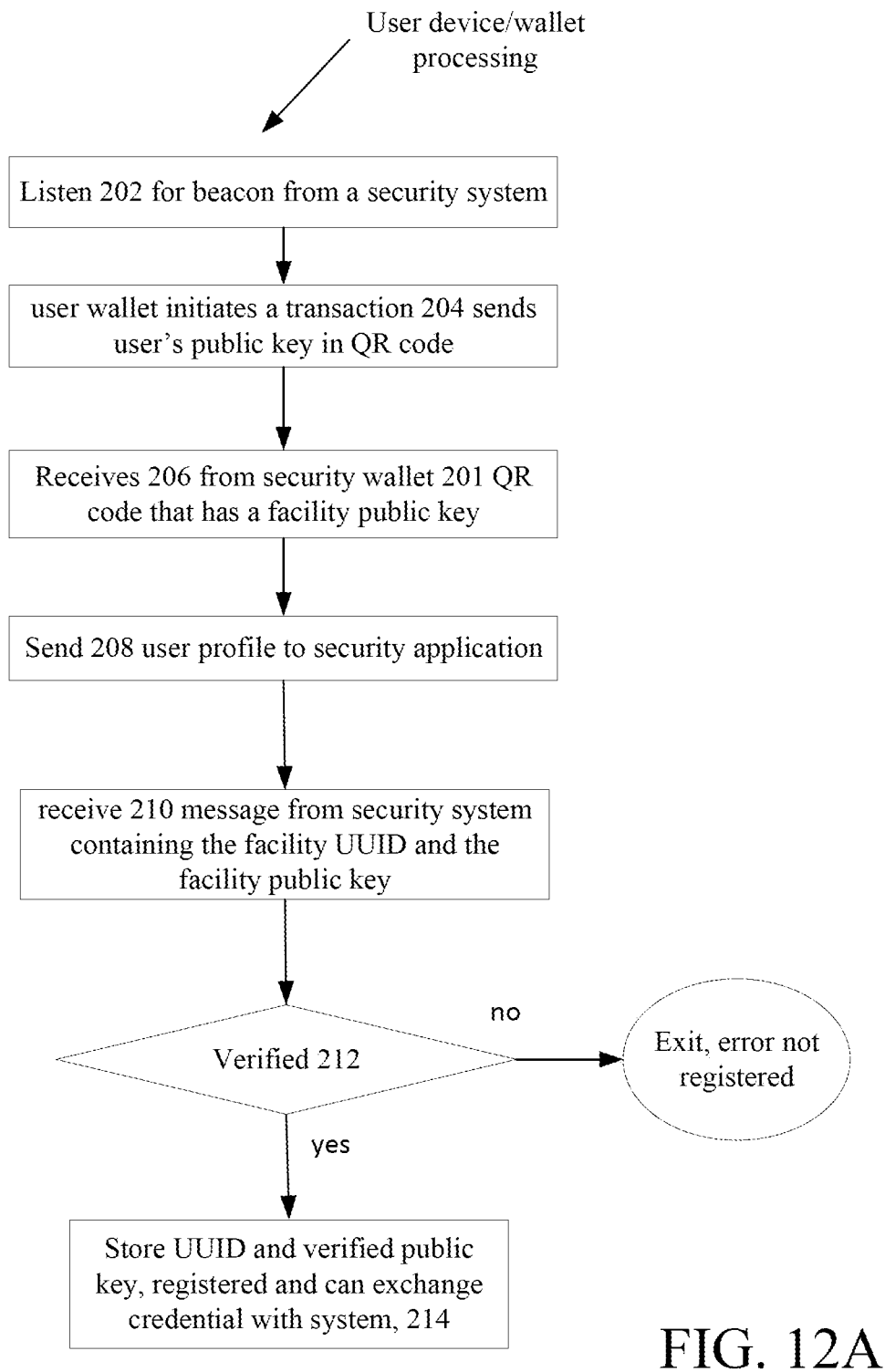
FIGS. 12A-12C and 13A-13C are flow diagrams.

Referring now to FIG. 12A, the technician device 12a portion credential-based registration process flow 200 is shown. The technician device 12a listens 202 for a beacon from the security system. The beacon includes a message to cause the technician's device to initiate 204 a transaction with the security server to send the technician's public key stored in the technician's wallet 13a. The technician's public key can be embedded in a code, such as a "QR"™ code (type of matrix barcode) that is stored in the technician's wallet 13a. Other approaches could be used.

The technician's wallet 13a requests 206 from a security wallet 201 of the security system 184, e.g., security application 188, an access QR code has embedded therein a facility public key. In some implementations, the facility public key as well as a facility UUID (discussed below) are specific to a single physical facility. However, in other implementations, the facility public key as well as the facility UUID are specific to a plurality of facilities of a single or related set of entities. From the wallet 13a, a technician profile corresponding to the technician associated with the device 12a is sent 208 to the security application 188. As used herein a UUID is an identifier, e.g., such as a Universally Unique Identifier (UUID) per the UUID identifier standard that uses a 128-bit value.

Figure 12B:
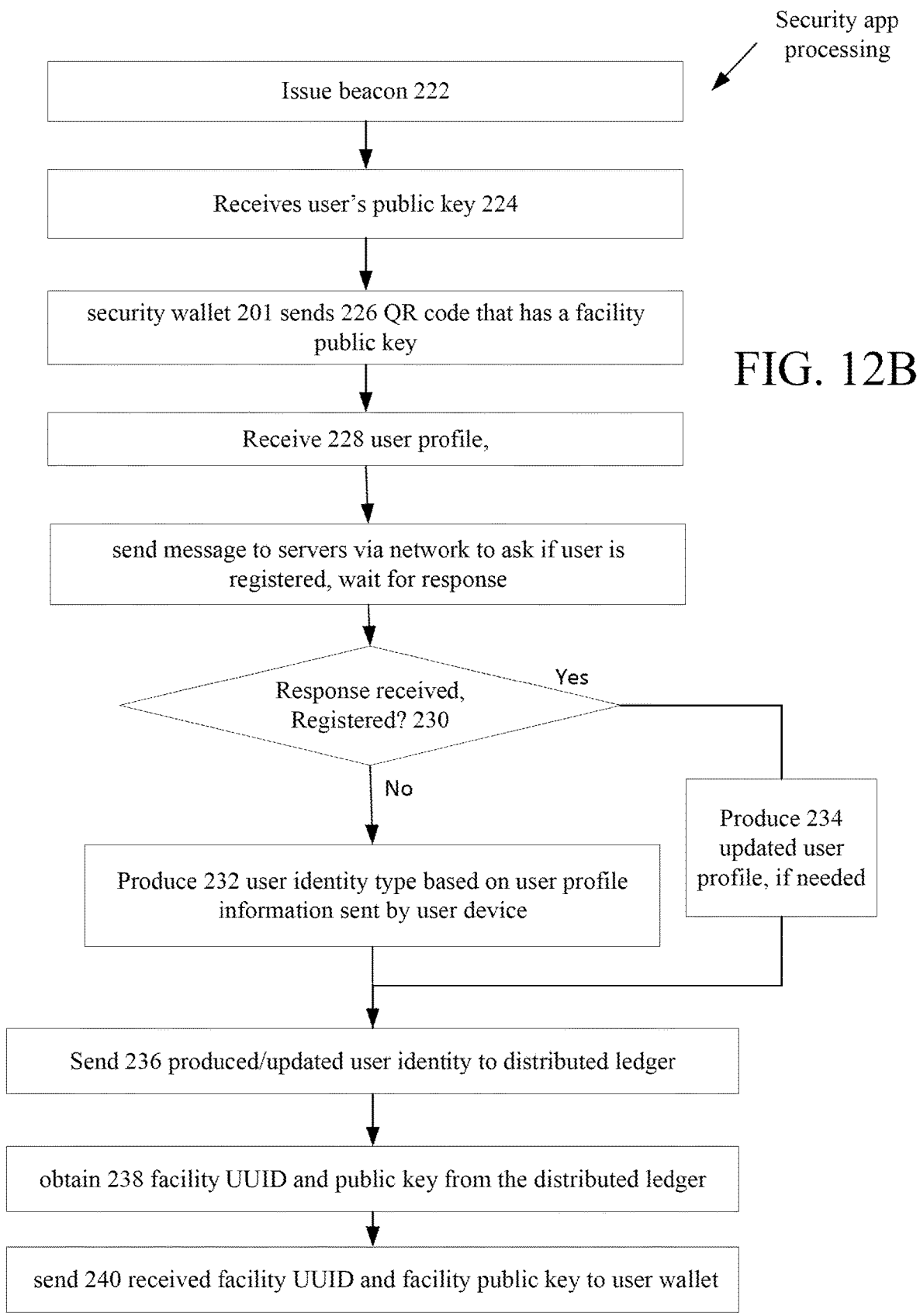

Referring now also to FIG. 12B, the security application 188 causes the security system to continually or periodically issue 222, a beacon, e.g., an electronic signal that is readable by the technician device 12a. The security application receives 224 the technician's public key. A security wallet 201 of the security application sends 226 a QR code that has a facility public key. The security application receives 228 the technician's profile corresponding to the technician associated with the device 12a. Upon receiving the technician profile, the security application 188 sends 228 a message to distributed networked servers to search for the technician via the distributed ledger 14. This search would be for the technicians PII information and expertise level data.

Upon receipt 230 of a search result, if the technician does not exist in the distributed ledger system 14, then the system will produce 232 a fault message. If the technician profile does exist it may be updated 234, if needed, based on the received profile information. The security system sends 236 updated technician identity to the distributed ledger 14, along with the received public key to the distributed ledger system 14 where the profile, public key of the technician are stored.

At this juncture, the technician has been verified. Thus, upon verification of the technician, the facility can be assured that it can exchange credentials with the technician device 12a and wallet 13a. The security system via the security application 188 sends 238 a message to the distributed network servers to obtain the facility UUID and the facility public key from the distributed ledger 14 and upon receiving the facility UUID and facility public key, sends 220 the facility UUID and the facility public key to the wallet 13a for verification and storage. The wallet 13a receives 210 a message from the security system, which contains the facility UUID and the facility public key. The wallet 13a verifies 212 the facility public key using similar processes as discussed above. If verified the technician device 12a and wallet 13a can be assured that this is a facility for which the technician device 12a and wallet 13a can furnish a mobile credential. When verified the wallet stores 214 the UUID and facility public key.

Figure 12C:
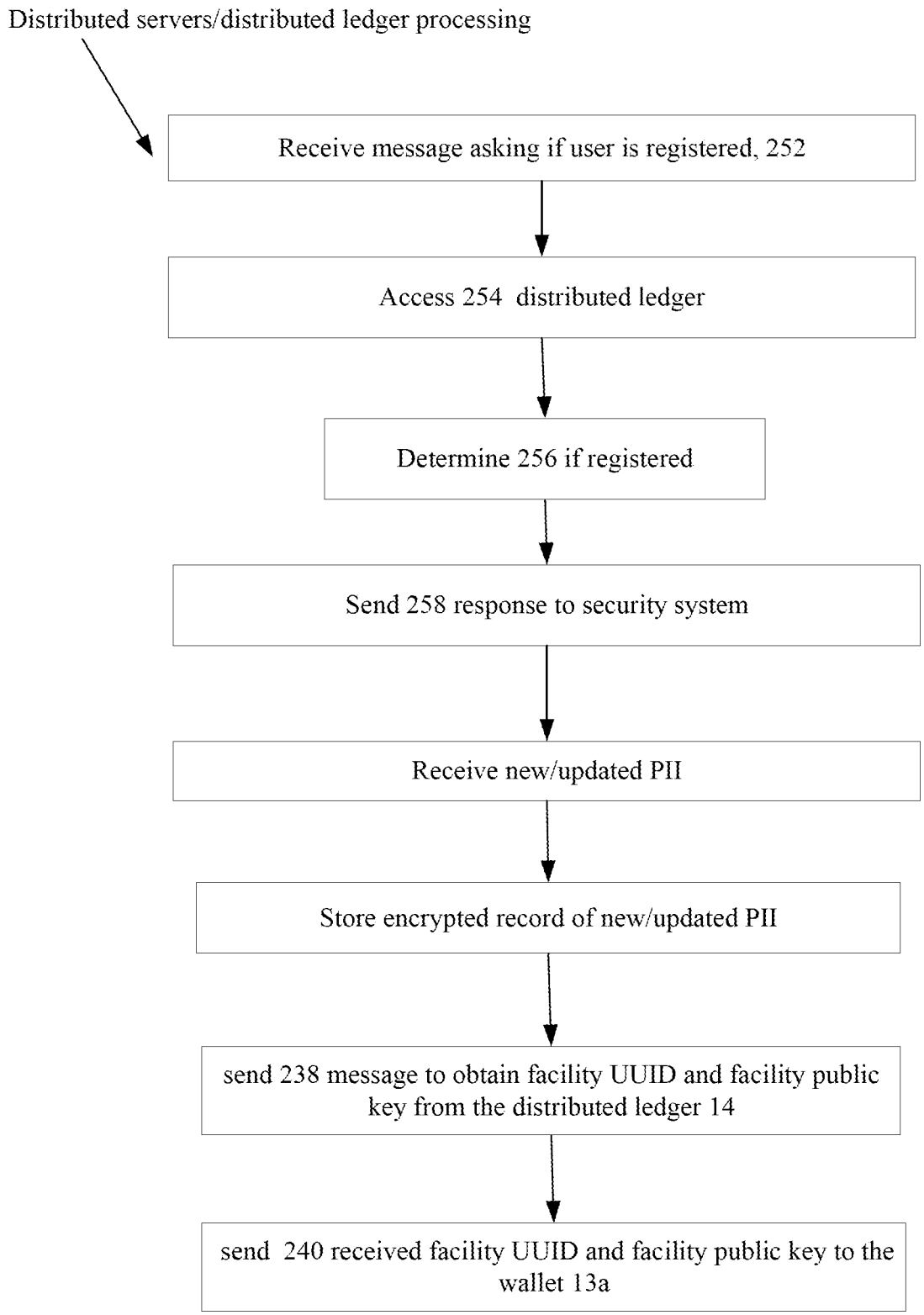

Referring now to FIG. 12C, the distributed servers receive 252 a message from the security system to conduct a search for a profile of the technician. The distributed servers access 254 the distributed ledger 14. The distributed servers determine 256 if a profile exists by searching the distributed ledger system 14 for a profile of the technician. The distributed servers send 258 a result of the search, e.g., registered, not registered, expired registration, etc. to the security system 18.

Credential-Based Technician Access

Credential-based access processing for permitting access using a registered mobile credential stored on the user device 12a (more specifically in the wallet 13a) to an access control system, uses the technician device, security/access systems and the distributed system/distributed ledger system. Access processing allows a user, e.g., technician, to verify a facility and vice-versa. The credential process is configured such that access with a particular set of credentials is limited to a single physical facility or the credential process can be configured such that the same set of credentials can be used for access to any number of facilities of the same entity to which the user would be normally granted access, depending on how the entity configures the access control process. Access is also limited according to requirements of the work order, as discussed above.

The credential process uses a credential exchange mechanism that allows a technician's wallet 13a to verify each facility under control of an entity that issues its own credentials that can be traced by the facility, obviating need for a central, certificate issuing authority, by each facility having a unique certificate similar to those commonly found today in website certificates. However, in this instance, the company is the issuer of the certificate. This gives the ability to have the credential carrier roles and permissions, conveyed by the reader application exchanging the roles and permissions of a user, without having to go back to a central service. This allows local control (exchange process of certificates). The mobile wallet 13a can access permissions from central facility (one time load) without the local control having to go back to central facility each time access is attempted.

Digital certificates are issued by a certificate authority or certification authority (CA), i.e., an entity that issues and certifies digital certificates, which certification is used to verify the ownership of a public key by the named entity associated with the certificate. The certification enables others that rely upon signatures or assertions made about the private key as corresponding to the certified public key. In this model of trust relationships, a CA could be a third party or in some implementations could be the entity itself rather than a trusted third party—trusted both by the owner of the certificate and by parties that would be relying on the certificate. Public-key infrastructure (PKI) schemes feature certifying authorities.

Technician access to a facility can give front door access and access through out a facility if the technician's device has a seal (discussed below) and is scheduled for a service call in the facility. As used herein, a "seal" is a token that is registered on a user' wallet 13s to verify that the user has gone through an initial authentication process. This "seal" would contain a signature from the security server 184 that validated the user's wallet under specified conditions (time interval, security level, etc.). The system using a Authenticated Network Architecture provisions the wallet 13a to automatically sign-in the technician via a technician pad (badge printed, etc.), and notifies a host system. With the seal, the technician with the wallet 13a is allowed to access a door during scheduled visit time and access other doors or portions of the facility according to access privileges in the tokens.

The technician is registered into the guest management system and when the technician shows up at the facility, the technician will scan the outside reader to gain access to a designated location, e.g., a building lobby). The scan verifies whether the technician is supposed to be at that location. Optionally, the system will tell the guest management system that the technician has signed in, the guest management system notifies an employee, and the employee, after meeting the technician, can accept the sign-in which will activate the technician's access to the building door readers for the time period of the service call. In other implementations, the need for access is avoided by the credentials carried in the technician's wallet 13a. Details of these processes are discussed below.

Described is a facility security application 188 to access and verify technicians or other service providers.

The technician's device 12a listens for a beacon from the security system, via a card access kiosk (kiosk). The lobby kiosk (or station) broadcasts a beacon (ID) that the technician's device, e.g., smartphone receives and, which the mobile wallet 13a detects. The technician device 12a connects to the kiosk, and the wallet 13a via the device 12a requests that the kiosk provide its credentials to the technician device 12a. The beacon includes a message to cause the technician's device 12a to initiate 604 a transaction with the kiosk to connect with the security server/security application on the kiosk. The technician's wallet 13*a* requests 606 from a security wallet 601 in the kiosk, e.g., security application 188, a facility certificate, OCSP and facility UUID (discussed below).

The technician's device 12*a* verifies 608 the credentials sent to the wallet 13*a* from the security wallet 201 of the security system 184, e.g., the facility certificate, the OCSP and the facility UUID. If the kiosk is valid, then the kiosk will provide its facility UUID, the facility certificate (public key for the facility) as well as the company UUID and company certificate (public key of the company). The wallet 13*a* verifies if, the wallet 13*a*, is paired with the company.

Other approaches include the beacon ID being that of the company UUID and if the wallet 13*a* is paired with that company, the wallet 13*a* (via the device 12*a*) then connects to the kiosk and requests details. The wallet 12*a* via the technician's device 12*a*, either connects and determines if the beacon is from a valid system or the beacon ID itself is formatted such that beacon from a valid system informs the wallet 12*a* that the beacon is from a kiosk and the wallet verifies the specifics by connecting to the kiosk.

The technician's wallet connects to the application once the beacon is detected. The application has the facility certificate, the facility UUID, and a revocation status, e.g., such as via the "Online Certificate Status Protocol" (OCSP) with or without OCSP stapling, as discussed above. Also other approaches could use certificate revocation lists (CRL), as discussed above.

Since the mobile wallet knows the company's public key, the mobile wallet can trust that any packets signed by the company are valid and can be trusted. When the mobile wallet 13*a* accesses a facility, the facility provides its facility specific public key to the mobile device 12*a* (wallet 13*a*). The mobile wallet 13*a* does not know if this facility is authentic and part of the company that the wallet 13*a* holds a mobile credential for, and thus before the wallet 13*a* exchanges its credentials, the wallet 13*a* needs to verify for certain that the facility is authentic.

Authenticity of the facility is determined by the wallet 13*a* through verification 608 of the facility's certificate. The verification process has the wallet 13*a* determine whether the facility certificate was signed by the company. If the certificate was signed by the company, then the wallet 13*a* verifies that the facility certificate and the signature match because the wallet has the company's public key and the wallet can verify the signature. If the signature is valid, then the wallet 13*a* knows that the facility certificate is authentic.

Although the certificate is authentic the wallet needs to verify that the certificate has not been revoked. The wallet can do this verification a number of ways, as discussed above.

Upon, the technician's wallet 13*a* verifying the facility credentials, e.g., facility certificate, a revocation status and facility UUID, the technician's wallet sends 610 a JWT message to the door kiosk app. The JWT message follows the so called JSON Web Token (JWT) format that is a JSON-based open standard (RFC 7519) for producing tokens that assert some number of "claims." The generated tokens, as above, are signed by the token producer's private key, so that door kiosk app in possession of the producer's public key is able to verify that the token is legitimate. The claims are used to pass identity of authenticated technicians between an identity provider and a service provider. The tokens can be authenticated and encrypted. Upon verification of the JWT message by the servers, the servers cause the kiosk to send an access status message that is received 612 by the wallet 13*a*, allowing or denying access to the facility, typically to a lobby door. An exemplary JWT message is JWT Format

| Claims | |
|---|---|
| iss | Issuer. The UUID of the Mobile Wallet |
| aud | The UUID of the Reader being accessed |
| exp | Expiration time of the token. Set to 30 seconds |
| jti | Unique token id. Server will track IDs over the expiration time period to ensure not duplicate JWT calls are made |
| iat | Time the token was issued/created |

The JWT contains the "iss" attribute which is a unique ID for the wallet. This unique ID is used by the reader or other system to obtain the stored public key and the JWT can be verified. If the token is not valid then an error response is sent to the wallet and access is not provided. The JWT has an "aud" attribute that identifies the destination of the token (i.e., the reader UUID). The JWT also includes an "exp" attribute that sets the expiration time of the token, and a "jti" attribute, i.e., and ID that can be used by the Reader or which can be used by an upstream system to ensure that the token can be used only once during the validity time (i.e., replays would be prevented). The "iat" attribute indicates the time that the JWT was issued.

Thus, the security application 188 can send to the technician device containing the wallet 13*a* a verified access or access error depending on the outcome of the process. All exchanges are logged in the distributed ledger for audit tracking, etc.

The JWT can also contain access policies that the reader can implement locally. For example, the JWT could contain roles that the wallet belongs to and those roles can be used by the reader to determine if the access should be provided or not with all decisions being made by the reader unit. This provides reduced latency in comparison with a centralized system approach where decisions based on roles, etc. are centrally made. The roles and access policies would be part of a JWT payload. A requirement would thus be that those roles and policies would need to be signed by the company and preferably would have an expiration date.

The reader will trust those policies if they meet the validation criteria which is composed of the follow types of checks:

The policies contain the wallet ID
The policies are signed by the Company
The policies are not expired The specifics of the encoding of the JWT payload have not been provided. However, the payload could be a binary payload inside of the JWT, an encoded attribute, or could be a second JWT produced by the company that the mobile wallet provides in addition to its own JWT, i.e., the company provided JWT for access. This second JWT produced by the company would contains the access policies, wallet id, and expiration time, would be signed by the company and the "iss" of the company.

Referring now to FIG. 13A, the technician device 12*a* portion 700*a* of the credential-based access process 700 is shown. The technician device 12*a* listens 702 for a beacon from a card reader. The card reader broadcasts a beacon (ID) that the smartphone receives and, which the mobile wallet detects. The technician device 12*a* connects to the card reader, and the wallet 13*a* via the device 12*a* requests that the card reader provide its credentials to the technician's device 12*a*. The beacon includes a message to cause the technician's device 12*a* to initiate 704 a transaction with the card reader to connect with the application on the card reader. The technician's wallet 13*a* requests 706 from a security wallet 701 in the card reader, e.g., security application 188, a facility certificate, OCSP and facility UUID (discussed below).

The technician's device 12*a* verifies 708 the credentials sent to the wallet 13*a* from the security wallet 701 of the security system 184, e.g., the facility certificate, the OCSP and the facility UUID. If the card reader is valid, then the card reader will provide its facility UUID, the facility certificate (public key for the facility) as well as the company UUID and company certificate (public key of the company). The wallet 13*a* verifies if, the wallet 13*a*, is paired with the correct facility.

Other approaches include the beacon ID being that of the company UUID and if the wallet 13*a* is paired with that company, the wallet 13*a* (via the device 12*a*) then connects to the kiosk and requests details. The wallet 12*a* via the technician's device 12*a*, either connects and determines if the beacon is from a valid system or the beacon ID itself is formatted such that beacon from a valid system informs the wallet 12*a* that the beacon is from the card reader and the wallet verifies the specifics by connecting to the card reader.

The technician's wallet connects to the application once the beacon is detected. The application has the facility certificate, the facility UUID, and a revocation status, e.g., such as via the "Online Certificate Status Protocol" (OCSP) as discussed above. Other approaches could be used.

Since the mobile wallet knows the company's public key, the mobile wallet can trust that any packets signed by the company are valid and can be trusted. When the mobile wallet 13*a* accesses the reader, the reader provides its facility specific public key to the mobile device 12*a* (wallet 13*a*). The mobile wallet 13*a* does not know if this facility is authentic and part of the company that the wallet 13*a* holds a mobile credential for, and thus before the wallet 13*a* exchanges its credentials, the wallet 13*a* needs to verify for certain that the reader is authentic.

Authenticity of the reader is determined by the wallet 13*a* through verification 708 of the facility's certificate. The verification process has the wallet 13*a* determine whether the facility certificate was signed by the company. If the certificate was signed by the company, then the wallet 13*a* verifies that the facility certificate and the signature match because the wallet has the company's public key and the wallet can verify the signature. If the signature is valid, then the wallet 13*a* knows that the facility certificate is authentic.

Although the certificate is authentic the wallet needs to verify that the certificate has not been revoked. The wallet can do this verification a number of ways as discussed above, e.g. directly through an OCSP request or with an OCSP response (i.e. OCSP stapling), as discussed above, or CRL.

Upon, the technician's wallet 13*a* verifying the facility credentials, e.g., facility certificate, a revocation status and facility UUID, the technician's wallet sends 710 a JWT message to the reader. The JWT message follows the so called JSON Web Token (JWT) format discussed above. The generated tokens, as above, are signed by the token producer's private key, so that door kiosk app in possession of the producer's public key is able to verify that the token is legitimate. The claims are used to pass identity of authenticated technicians between an identity provider and a service provider. The tokens can be authenticated and encrypted. Upon verification of the JWT message by the servers, the servers cause the reader to send an access status message that is received 712 by the wallet 13*a*, allowing or denying access.

Referring now also to FIG. 13B, the security application 188 processing 700*b* causes the security system reader to continually or periodically issue 722, the beacon that is readable by the technician device 12*a* and which causes the technician device to request 724 a connection to the reader. As mentioned above, the technician device 12*a* upon connecting to the reader has the reader provide 726 its credentials to the technician's device 12*a* (wallet 13*a*). If the verification by the wallet was successful, the wallet sends the JWT message, and upon receipt 728 of the JWT message by the reader, the JWT is sent 730 to the distributed network to a server that is used to verify the JWT token. Upon verification of the JWT message by the servers, the servers send the reader an access status message that is received 732 and is sent 734 to the wallet 13*a* allowing or denying access to the facility.

Referring now also to FIG. 13C, the distributed servers/distributed ledger processing 700*c* is shown. The JWT is received 742 by the distributed servers and is verified 744. If the JWT is not verified, an error is raised 748 (see below). If the JWT is verified, 746 the technician is granted access 750, and an access control system grants the access and sends signal to unlock a door, etc. In addition, whether the JWT is verified or not verified, a corresponding entry record of either an access entry or an access denied entry is produced 752 as an access log that is stored 754 and maintained in the distributed ledger system.

The security application 188 sends a check-in technician message to the guest management system, to verify that the technician has a scheduled visit. The guest management system notifies an access system when the technician has a verified meeting by pushing a notification via the distributed network to the access system. If the JWT is verified, user is granted access, and an access control system grants the access and sends signal to unlock a door, etc., as generally discussed above. In some implementations when granting access the system also checks current time/date and if technician has been activated and time/date is within a window for which access would be permitted, e.g., a meeting window.

All exchanges are logged in the distributed ledger for audit tracking, etc. Records are added to the distributed ledger as transactions and include a hashed record of the transaction, what was exchanged, the signatures of the parties, and may include additional detailed information depending on the type of distributed ledger used. The information stored for audit can include the date and time that the mobile wallet sent a JWT, the JWT parameters, and the access status or error conditions.

Figure 14:
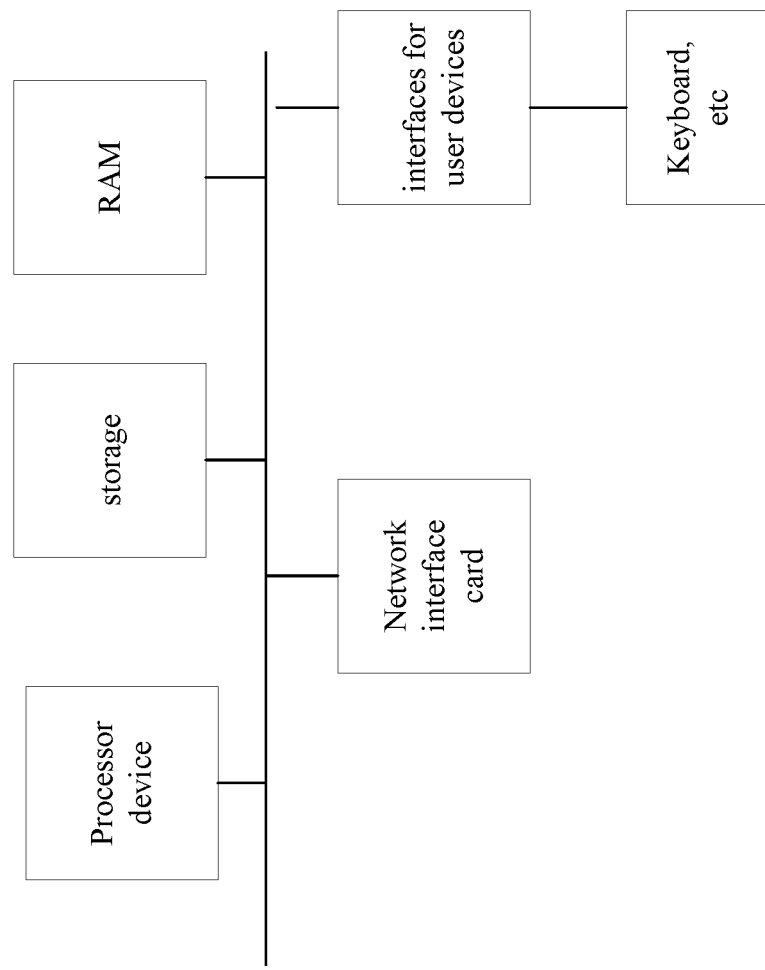
FIG. 14 is a block diagram of an exemplary device/system.

Referring now to FIG. 14, components of system/devices are shown. Memory stores program instructions and data used by the processor. The memory may be a suitable combination of random access memory and read-only memory, and may host suitable program instructions (e.g. firmware or operating software), and configuration and operating data and may be organized as a file system or otherwise. The program instructions stored in the memory may further store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Servers are associated with an IP address and port(s) by which it communicates with user devices. The server address may be static, and thus always identify a particular one of monitoring server to the intrusion detection panels. Alternatively, dynamic addresses could be used, and associated with static domain names, resolved through a domain name service. The network interface card interfaces with the network to receive incoming signals, and may for example take the form of an Ethernet network interface card (NIC). The servers may be computers, thin-clients, or the like, to which received data representative of an alarm event is passed for handling by human operators. The monitoring station may further include, or have access to, a subscriber database that includes a database under control of a database engine. The database may contain entries corresponding to the various subscriber devices/processes to panels like the panel that are serviced by the monitoring station.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Computer program products are stored in a tangible form on non-transitory computer readable media and non-transitory physical hardware storage devices that are suitable for embodying computer program instructions and data. These include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory and other non-transitory devices.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other implementations not specifically described herein are also within the scope of the following claims.

What is claimed is:

1. A method, comprising: receiving, by one or more processing circuits, a work order upon receipt of a service request for a piece of equipment in a location within a building, and one or more maintenance actions to perform on the piece of equipment;
   determining, by the one or more processing circuits, a requisite level of expertise required for the service request from the work order, the requisite level of expertise indicating that a first service provider needs expertise servicing a type of equipment of the piece of equipment of the work order;
   communicating, by the one or more processing circuits, an indication of the requisite level of expertise for completing the work order to a device of the first service provider and a device of a second service provider prior to the first service provider and the second service provider checking in at the building;
   receiving, by the one or more processing circuits, one or more first requisite or one or more first education levels of a first service provider from the device of the first service provider responsive to the first service provider checking in at the building and one or more second certifications or one or more second education levels of the second service provider from the device of the second service provider responsive to the second service provider checking in at the building;
   encrypting, by the one or more processing circuits, the one or more first certifications to generate one or more first encrypted certifications and the one or more second certifications to generate one or more second encrypted certifications;
   determining, by the one or more processing circuits based on comparing the one or more first encrypted certifications with a first hash of the one or more first certifications stored by a distributed ledger separate from the one or more processing circuits and comparing the one or more second certifications with a second hash of the one or more second certifications stored by the distributed ledger, that the one or more first certifications or the one or more first education levels indicate that the first service provider has the requisite level of expertise and that the one or more second certifications or one or more the second education levels indicate that the second service provider does not have the requisite level of expertise, the one or more first certifications or the one or more first education levels indicating that the first service provider has the expertise servicing the type of equipment and the one or more second certifications or the one or more second education levels indicating that the second service provider has expertise servicing a different type of equipment than the type of equipment;

sending a notification to the device of the second service provider notifying the second service provider that the second service provider does not have the requisite level of expertise to be assigned the work order and denying the second service provider access to the building;

identifying, by the one or more processing circuits, one or more doors of the building that allow access to the location within the building that the piece of equipment is located in;

determining, a length of time needed for the first service provider to perform the one or more maintenance actions on the piece of equipment;

assigning, by the one or more processing circuits, access to the one or more doors of the building to a credential associated with the first service provider for the length of time in response to a determination that the one or more first certifications or the one or more first education levels indicate that the first service provider has the requisite level of expertise; and causing, by the one or more processing circuits, the one or more doors to unlock based on the credential associated with the first service provider.

2. The method of claim 1 further comprises:
sending, by the one or more processing circuits, a request for service to the first service provider.

3. The method of claim 1, further comprising:
receiving, by the one or more processing circuits, expertise data and identity data of the first service provider from the device of the first service provider.

4. The method of claim 1, further comprising:
sending, by the one or more processing circuits, the device of the first service provider a beacon signal to initiate a transaction with the one or more processing circuits, wherein the device of the first service provider stores a mobile credential.

5. The method of claim 4, further comprising:
receiving, by the one or more processing circuits, the mobile credential for validating personal information;
causing, by the one or more processing circuits, a mobile application to be downloaded onto the device of the first service provider and the device of the second service provider;
sending, by the one or more processing circuits, a QR code or other electronic code to the device of the first service provider and the device of the second service provider; and
receiving, by the one or more processing circuits, from the device of the first service provider and the device of the second service provider, information that is required at check in at a facility.

6. The method of claim 1, further comprising:
receiving, by the one or more processing circuits, expertise data and identity data of the second service provider from the device of the second service provider.

7. A system comprising:
one or more processing circuits configured to:
receive a work order for a piece of equipment in a location within a building, and one or more maintenance actions to perform on the piece of equipment;
determine, from the work order, a requisite level of expertise required for a service of the work order, the requisite level of expertise indicating that a first service provider needs expertise servicing a type of equipment of the piece of equipment of the work order;
communicate an indication of the requisite level of expertise for completing the work order to a device of the first service provider and a device of a second service provider prior to the first service provider and the second service provider checking in at the building;
receive first attributes of a first service provider responsive to the first service provider checking in at the building and second attributes of the second service provider responsive to the second service provider checking in at the building;
encrypt one or more first certifications to generate one or more first encrypted certifications and one or more second certifications to generate one or more second encrypted certifications;
determine, based on comparing the one or more first encrypted certifications with a first hash of the one or more first certifications stored by a distributed ledger separate from the one or more processing circuits and comparing the one or more second certifications with a second hash of the one or more second certifications stored by the distributed ledger, that the first attributes indicate that the first service provider has the requisite level of expertise and that the second attributes indicate that the second service provider does not have the requisite level of expertise, the first attributes indicating that the first service provider has the expertise servicing the type of equipment and the second attributes indicating that the second service provider has expertise servicing a different type of equipment than the type of equipment;
sending a notification to the device of the second service provider notifying the second service provider that the second service provider does not have the requisite level of expertise to be assigned the work order and denying the second service provider access to the building;
identify one or more doors of the building that allow access to the location within the building that the piece of equipment is located in;
determining, a length of time needed for the first service provider to perform the one or more maintenance actions on the piece of equipment;
assign access to the one or more doors of the building to a credential associated with the first service provider for the length of time in response to a determination that the first attributes indicate that the first service provider has the requisite level of expertise; and
cause the one or more doors to unlock based on the credential associated with the first service provider.

8. The system of claim 7, wherein the first attributes include expertise data and identity data of the first service provider.

9. The system of claim 7, wherein the one or more processing circuits are configured to send the device of the first service provider a beacon signal initiating a transaction, wherein the device of the first service provider stores a mobile credential.

10. The system of claim 9, wherein the one or more processing circuits are configured to:
receive the mobile credential for validating personal information;
cause a mobile application to be downloaded onto the device of the first service provider and the device of the second service provider;
send a QR code or other electronic code to the device of the first service provider and the device of the second service provider; and receive, from the device of the first service provider and the device of the second service provider, information that is required at check in at a facility.

11. The system of claim 7, wherein the first attributes include an education level attribute indicating an education level of the first service provider.

12. The system of claim 7, wherein the first attributes include one or more certification attributes indicating certifications held by the first service provider.

13. The system of claim 7, wherein the one or more processing circuits are configured to:
send a request for the service to the first service provider.

14. One or more non-transitory computer readable medium configured to store instructions thereon that, when executed by one or more processing circuits, cause the one or more processing circuits to:
receive a work order for a piece of equipment in a location within a building, and one or more maintenance actions to perform on the piece of equipment;
determine, from the work order, a requisite level of expertise required for service of the work order, the requisite level of expertise indicating that a first service provider needs expertise servicing a type of equipment of the piece of equipment of the work order;
communicate an indication of the requisite level of expertise for completing the work order to a device of the first service provider and a device of a second service provider prior to the first service provider and the second service provider checking in at the building;
receive first attributes of a first service provider responsive to the first service provider checking in at the building and second attributes of the second service provider responsive to the second service provider checking in at the building;
encrypt one or more first certifications to generate one or more first encrypted certifications and one or more second certifications to generate one or more second encrypted certifications;
determine, based on comparing the one or more first encrypted certifications with a first hash of the one or more first certifications stored by a distributed ledger separate from the one or more processing circuits and comparing the one or more second certifications with a second hash of the one or more second certifications stored by the distributed ledger, whether the first attributes received indicate that the first service provider has the requisite level of expertise and that the second attributes indicate that the second service provider does not have the requisite level of expertise, the first attributes indicating that the first service provider has the expertise servicing the type of equipment and the second attributes indicating that the second service provider has expertise servicing a different type of equipment than the type of equipment;
sending a notification to the device of the second service provider notifying the second service provider that the second service provider does not have the requisite level of expertise to be assigned the work order;
identify one or more doors of the building that allow access to the location within the building that the piece of equipment is located in;
determining, a length of time needed for the first service provider to perform the one or more maintenance actions on the piece of equipment;
assign access to the one or more doors of the building to a credential associated with the first service provider for the length of time in response to a determination that the first attributes indicate that the first service provider has the requisite level of expertise; and
cause the one or more doors to unlock based on the credential associated with the first service provider.

15. The one or more non-transitory computer readable medium of claim 14, wherein the instructions cause the one or more processing circuits to:
receive the credential for validating personal information;
cause a mobile application to be downloaded onto the device of the first service provider and the device of the second service provider;
send a QR code or other electronic code to the device of the first service provider and the device of the second service provider; and
receive, from the device of the first service provider and the device of the second service provider, information that is required at check in at a facility.

16. The one or more non-transitory computer readable medium of claim 14, wherein the instructions cause the one or more processing circuits to:
send a request for the service to the first service provider.

17. The one or more non-transitory computer readable medium of claim 14, wherein the first attributes include expertise data and identity data of the first service provider.

18. The one or more non-transitory computer readable medium of claim 14, wherein the instructions cause the one or more processing circuits to:
send the device of the first service provider a beacon signal to initiate a transaction with the one or more processing circuits, wherein the device stores a mobile credential.

19. The one or more non-transitory computer readable medium of claim 14, wherein the first attributes include an education level attribute indicating an education level of the first service provider;
wherein the first attributes include one or more certification attributes indicating certifications held by the first service provider.

20. The one or more non-transitory computer readable medium of claim 14, wherein the instructions cause the one or more processing circuits to:
receive expertise data and identity data of the second service provider from the device of the second service provider.

* * * * *